US012595322B2

(12) United States Patent
Padilla-Acevedo et al.

(10) Patent No.: US 12,595,322 B2
(45) Date of Patent: Apr. 7, 2026

(54) GAS-PHASE BIPHENYLPHENOL POLYMERIZATION CATALYSTS

(71) Applicant: Dow Global Technologies LLC, Midland, MI (US)

(72) Inventors: Angela I. Padilla-Acevedo, Lake Jackson, TX (US); Andrew J. Young, Houston, TX (US); Roger L. Kuhlman, Lake Jackson, TX (US); Susan Brown, Pearland, TX (US); Matthew E. Belowich, Midland, MI (US); David R. Neithamer, Midland, MI (US); Jerzy Klosin, Midland, MI (US); David M. Pearson, Lake Jackson, TX (US); Leslie E. O'Leary, Sugar Land, TX (US); Joseph F. DeWilde, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 894 days.

(21) Appl. No.: 17/786,672

(22) PCT Filed: Dec. 17, 2020

(86) PCT No.: PCT/US2020/065561

§ 371 (c)(1),
(2) Date: Jun. 17, 2022

(87) PCT Pub. No.: WO2021/127150

PCT Pub. Date: Jun. 24, 2021

(65) Prior Publication Data

US 2023/0098987 A1 Mar. 30, 2023

Related U.S. Application Data

(60) Provisional application No. 62/950,401, filed on Dec. 19, 2019.

(51) Int. Cl.

| | |
|---|---|
| ***C08F 210/16*** | (2006.01) |
| ***C08F 2/34*** | (2006.01) |
| ***C08F 4/659*** | (2006.01) |
| ***C08F 4/6592*** | (2006.01) |
| ***C08F 110/02*** | (2006.01) |

(52) U.S. Cl.

CPC .............. *C08F 110/02* (2013.01); *C08F 2/34* (2013.01); *C08F 4/65927* (2013.01); *C08F 210/16* (2013.01)

(58) Field of Classification Search

CPC ....... C08F 210/16; C08F 4/65927; C08F 2/34
See application file for complete search history.

(56) References Cited

U.S. PATENT DOCUMENTS

| | | | | |
|---|---|---|---|---|
| 6,593,438 | B2 | 7/2003 | Oskam | |
| 8,034,735 | B2 | 10/2011 | Fushimi et al. | |
| 8,586,497 | B2 | 11/2013 | Kolb et al. | |
| 8,835,577 | B2 | 9/2014 | Rix et al. | |
| 9,006,342 | B2 * | 4/2015 | Van Dun | C08L 23/0815 525/240 |
| 9,234,060 | B2 | 1/2016 | Kao et al. | |
| 9,637,566 | B2 | 5/2017 | Kwon et al. | |
| 9,751,998 | B2 | 9/2017 | Klosin et al. | |
| 10,077,322 | B2 | 9/2018 | Baita et al. | |
| 10,556,972 | B2 | 2/2020 | Baita et al. | |
| 10,654,029 | B2 | 5/2020 | Faler et al. | |
| 2009/0306323 | A1 | 12/2009 | Kolb et al. | |
| 2015/0166699 | A1 | 6/2015 | Kao et al. | |
| 2015/0291713 | A1 | 10/2015 | Klosin et al. | |
| 2016/0108156 | A1 | 4/2016 | Klosin et al. | |
| 2018/0194871 | A1 * | 7/2018 | Figueroa | C08F 4/64193 |
| 2018/0265604 | A1 | 9/2018 | Figueroa et al. | |
| 2018/0282452 | A1 | 10/2018 | Fontaine et al. | |
| 2019/0276573 | A1 | 9/2019 | Carnahan et al. | |
| 2020/0048382 | A1 | 2/2020 | Holtcamp et al. | |
| 2022/0403061 | A1 * | 12/2022 | Padilla-Acevedo | C08F 210/16 |
| 2022/0411546 | A1 * | 12/2022 | Young | C08F 4/02 |

FOREIGN PATENT DOCUMENTS

| | | | | |
|---|---|---|---|---|
| EP | 1013675 B1 | | 7/2002 | |
| WO | 2018013285 A1 | * | 1/2018 | C08F 210/16 |

OTHER PUBLICATIONS

International Preliminary Report on Patentability for related PCT Application No. PCT/US2020/065561, mailed on Jun. 30, 2022 (9 pgs).
International Search Report & Written Opinion for related PCT Application No. PCT/US2020/065561, mailed on Apr. 13, 2021 (13 pgs).

* cited by examiner

*Primary Examiner* — Rip A Lee

(57) ABSTRACT

Embodiments are directed towards a use of a supported gas-phase biphenylphenol polymerization catalyst to make a polymer via a gas-phase polymerization process, wherein the supported gas-phase biphenylphenol polymerization catalyst is made from a gas-phase biphenylphenol polymerization precatalyst of Formula I.

7 Claims, No Drawings

GAS-PHASE BIPHENYLPHENOL POLYMERIZATION CATALYSTS

This application is a National Stage Application under 35 U.S.C. § 371 of International Application Number PCT/US2020/065561, filed Dec. 17, 2020 and published as WO 2021/127150 on Jun. 24, 2021, which claims the benefit to U.S. Provisional Application 62/950,401, filed Dec. 19, 2019, the entire contents of which are incorporated herein by reference in its entirety.

FIELD OF DISCLOSURE

Embodiments of the present disclosure are directed towards gas-phase biphenylphenol polymerization catalysts, more specifically, gas-phase biphenylphenol polymerization catalysts that may be utilized to make a polymer via a gas-phase polymerization process.

BACKGROUND

Polymers may be utilized for a number of products including as films, fibers, nonwoven and/or woven fabrics, extruded articles, and/or molded articles, among others. Polymers can be made by reacting one or more types of monomer in a polymerization reaction in the presence of a polymerization catalyst.

SUMMARY

The present disclosure provides various embodiments, including:

A use of a supported gas-phase biphenylphenol polymerization catalyst to make a polymer via a gas-phase polymerization process, where the supported gas-phase biphenylphenol polymerization catalyst is made from a gas-phase biphenylphenol polymerization precatalyst of Formula I:

(Formula I)

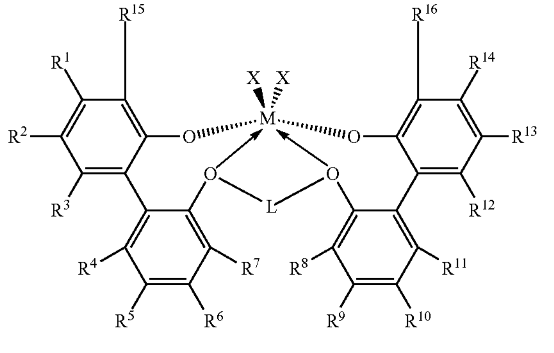

where each of $R^5$, $R^7$, $R^8$, and $R^{10}$ is independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$) alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a linear $C_3$ or $C_4$ alkylene that forms a 3-carbon bridge or 4-carbon bridge, respectively, between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen or ($C_1$-$C_8$)alkyl; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is zirconium (Zr) or Hafnium (Hf).

DETAILED DESCRIPTION

A supported gas-phase biphenylphenol polymerization catalyst which can be used make a polymer via a gas-phase polymerization process is made from a gas-phase biphenylphenol polymerization precatalyst of Formula I:

(Formula I)

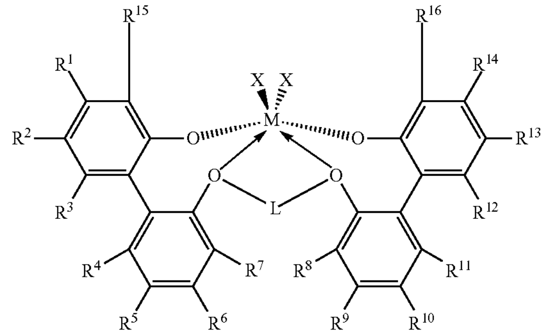

where each of $R^5$, $R^7$, $R^8$, and $R^{10}$ is independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$) alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a linear $C_3$ or $C_4$ alkylene that forms a 3-carbon bridge or 4-carbon bridge, respectively, between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen or ($C_1$-$C_8$)alkyl; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is Zr or Hf.

The gas-phase biphenylphenol polymerization precatalyst represented by the Formula I (i.e., the gas-phase biphenylphenol polymerization precatalyst), as described herein, may be utilized to make a gas-phase biphenylphenol polymerization catalysts. For instance, the gas-phase biphenylphenol polymerization precatalyst represent by the Formula I may be contacted, under activating conditions, with an activator so as to activate the gas-phase biphenylphenol polymerization precatalyst represent by the Formula I, thereby making the gas-phase biphenylphenol polymerization catalyst.

As mentioned, each of $R^5$, $R^7$, $R^8$, and $R^{10}$, as shown in Formula I, can independently be a ($C_1$ to $C_{20}$)alkyl, aryl, aralkyl, halogen, or a hydrogen. One or more embodiments provide that at least one of $R^5$, $R^7$, $R^8$, and $R^{10}$ is a halogen such as fluorine. One or more embodiments provide that each of $R^5$, $R^7$, $R^8$, and $R^{10}$ is a halogen such as fluorine. One or more embodiments provide that each of $R^5$ and $R^{10}$ is a halogen such as fluorine. One or more embodiments provide that at least one of $R^5$ and $R^{10}$ is an alkyl- or aryl-substituted silyl. One or more embodiments provide that each of $R^5$ and $R^{10}$ is a di-alkyl or tri-alkyl substituted silyl. One or more embodiments provide that each of $R^5$ and $R^{10}$ is an octyl dimethyl silyl.

One or more embodiments provide that each of $R^1$, $R^3$, $R^{12}$, and $R^{14}$ independently is a $(C_1\text{-}C_8)$alkyl, halogen, or a hydrogen. One or more embodiments provide that at least one of $R^1$, $R^3$, $R^{12}$, and $R^{14}$ is a hydrogen. One or more embodiments provide that each of $R^1$, $R^3$, and $R^{14}$ is a hydrogen. $R^{12}$, One or more embodiments provide that at least one of $R^7$ and $R^8$ is a hydrogen. One or more embodiments provide that each of $R^7$ and $R^8$ is a hydrogen. One or more embodiments provide that at least one of $R^7$ and $R^8$ is a $C_1$ alkyl, e.g. methyl. One or more embodiments provide that each of $R^7$ and $R^8$ is a methyl.

One or more embodiments provide that each of $R^6$ and $R^9$ is a hydrogen or $(C_1\text{-}C_8)$alkyl. One or more embodiments provide that each of $R^6$ and $R^9$ is a hydrogen.

As used herein, an "alkyl" includes linear, branched and cyclic paraffin radicals that are deficient by one hydrogen. Thus, for example, a $CH_3$ group ("methyl") and a $CH_3CH_2$ group ("ethyl") are examples of alkyls.

As used herein, "aryl" includes phenyl, naphthyl, pyridyl and other radicals whose molecules have the ring structure characteristic of benzene, naphthylene, phenanthrene, anthracene, etc. It is understood that an "aryl" can be a $C_6$ to $C_{20}$ aryl. For example, a $C_6H_5$-aromatic structure is a "phenyl", a $C_6H_4$-aromatic structure is a "phenylene." As used herein, an "aralkyl," which can also be called an "arylalkyl," is an alkyl having an aryl pendant therefrom. It is understood that an aralkyl can be a $C_7$ to $C_{20}$ aralkyl. An "alkylaryl" is an aryl having one or more alkyls pendant therefrom. As used herein, a "hydrocarbyl" includes aliphatic, cyclic, olefinic, acetylenic and aromatic radicals (i.e., hydrocarbon radicals) comprising hydrogen and carbon that are deficient by one hydrogen.

As mentioned, each of $R^4$ and $R^{11}$ as shown in Formula I, can independently be a hydrogen or a halogen such as fluorine. For instance, one or more embodiments provide that each of $R^4$ and $R^{11}$ is a hydrogen.

As mentioned, each of $R^2$ and $R^{13}$ as shown in Formula I, can independently be a $(C_1$ to $C_{20})$alkyl, aryl or aralkyl or a hydrogen. One or more embodiments provide that each of $R^2$ and $R^{13}$ is a $(C_3\text{-}C_4)$alkyl such as n-butyl, t-butyl, or 2-methyl-pentyl. One or more embodiments provide that each of $R^2$ and $R^{13}$ is a 1,1,3,3-tetramethylbutyl. One or more embodiments provide that each of $R^2$ and $R^{13}$ is a $(C_1)$alkyl i.e., a methyl.

As mentioned, each of $R^{15}$ and $R^{16}$ as shown in Formula I, can be a 2,7-disubstituted carbazol-9-yl or a 3,6-disubstituted carbazol-9-yl. For instance, one or more embodiments provide that each of $R^{15}$ and $R^{16}$ is a 2,7-disubstituted carbazol-9-yl selected from a group consisting of a 2,7-di-t-butylcarbazol-9-yl, a 2,7-diethylcarbazol-9-yl, a 2,7-di methylcarbazol-9-yl, and a 2,7-bis(diisopropyl(n-octyl)silyl)-carbazol-9-yl. One or more embodiments provide that each of $R^{15}$ and $R^{16}$ is a 3,6-disubstituted carbazol-9-yl selected from a group consisting of a 3,6-di-t-butylcarbazol-9-yl, a 3,6-diethylcarbazol-9-yl, a 3,6-di methylcarbazol-9-yl, and a 3,6-bis(diisopropyl(n-octyl)silyl)-carbazol-9-yl.

As mentioned, L, as shown in Formula I, can be a linear $C_3$ or $C_4$ alkylene that forms a 3-carbon bridge or 4-carbon bridge, respectively, between the two oxygen atoms to which L is covalently bonded. For instance, in one or more embodiments L can be a saturated $(C_3\text{-}C_4)$alkyl that forms a 3-carbon or 4-carbon bridge between the two oxygen atoms to which L is bonded. One or more embodiments provide that L is a saturated $(C_3)$alkyl that forms a bridge between the two oxygen atoms to which L is bonded. The term "saturated" means lacking carbon-carbon double bonds, carbon-carbon triple bonds, and (in heteroatom-containing groups) carbon-nitrogen, carbon-phosphorous, and carbon-silicon double or triple bonds. One or more embodiments provide that L is a saturated $(C_4)$alkyl that forms a bridge between the two oxygen atoms to which L is bonded.

As mentioned, each X, as shown in Formula I, can independently be a halogen, a hydrogen, a $(C_1\text{-}C_{20})$alkyl, a $(C_7\text{-}C_{20})$aralkyl, a $(C_1\text{-}C_6)$alkyl-substituted $(C_6\text{-}C_{12})$aryl, or a $(C_1\text{-}C_6)$alkyl-substituted benzyl, $—CH_2Si(R^C)_3$, where $R^C$ is $(C_1\text{-}C_{12})$hydrocarbon. For instance, one or more embodiments provide that each X is a $(C_1)$alkyl.

As mentioned, M, as shown in Formula I, is a heteroatom such as a metal atom. In some embodiments, M can be selected from a group consisting of Zr and Hf. One or more embodiments provide that M is zirconium. One or more embodiments provide that M is hafnium.

Each of the R groups ($R^1$-$R^{16}$) and the X's of Formula I, as described herein, can independently be substituted or unsubstituted. For instance, in some embodiments, each of the X's of Formula I can independently be a $(C_1\text{-}C_6)$alkyl-substituted $(C_6\text{-}C_{12})$aryl, or a $(C_1\text{-}C_6)$alkyl-substituted benzyl. As used herein, "substituted" indicates that the group following that term possesses at least one moiety in place of one or more hydrogens in any position, the moieties selected from such groups as halogen radicals, hydroxyl groups, carbonyl groups, carboxyl groups, amine groups, phosphine groups, alkoxy groups, phenyl groups, naphthyl groups, $(C_1$ to $C_{20})$alkyl groups, $(C_2$ to $C_{10})$alkenyl groups, and combinations thereof. Being "disubstituted" refers to the presence of two or more substituent groups in any position, the moieties selected from such groups as halogen radicals, hydroxyl groups, carbonyl groups, carboxyl groups, amine groups, phosphine groups, alkoxy groups, phenyl groups, naphthyl groups, $(C_1$ to $C_{20})$alkyl groups, $(C_2$ to $C_{10})$alkenyl groups, and combinations thereof.

The metallocene olefin polymerization catalyst and a gas-phase biphenylphenol polymerization catalyst made from a gas-phase biphenylphenol polymerization precatalyst herein can be made utilizing reactants mentioned herein. The metallocene olefin polymerization catalyst and a gas-phase biphenylphenol polymerization catalyst made from a gas-phase biphenylphenol polymerization precatalyst herein can be made by a number of processes, e.g. with conventional solvents, reaction conditions, reaction times, and isolation procedures, utilized for making known catalysts such as known metallocene olefin polymerization catalysts.

One or more embodiments provide a polymerization catalyst, namely a gas-phase biphenylphenol polymerization catalyst made from a gas-phase biphenylphenol polymerization precatalyst of Formula I. The gas-phase biphenylphenol polymerization catalyst can be made by contacting, under activating conditions, the gas-phase biphenylphenol polymerization precatalysts and an activator to provide the gas-phase biphenylphenol polymerization catalyst, e.g. an activated gas-phase biphenylphenol polymerization precatalyst. Activating conditions are well known in the art.

As used herein, "activator" refers to any compound or combination of compounds, supported, or unsupported, which can activate a complex or a catalyst component, such as by creating a cationic species of the catalyst component. For example, this can include the abstraction of at least one leaving group, e.g., the "X" group described herein, from the metal center of the complex/catalyst component, e.g. the metal complex of Formula I. As used herein, "leaving group" refers to one or more chemical moieties bound to a metal atom and that can be abstracted by an activator, thus producing a species active towards olefin polymerization.

The activator can include a Lewis acid or a non-coordinating ionic activator or ionizing activator, or any other compound including Lewis bases, aluminum alkyls, and/or conventional-type co-catalysts. In addition to methylaluminoxane ("MAO") and modified methylaluminoxane ("MMAO") mentioned above, illustrative activators can include, but are not limited to, aluminoxane or modified aluminoxane, and/or ionizing compounds, neutral or ionic, such as Dimethylanilinium tetrakis(pentafluorophenyl)borate, Triphenylcarbenium tetrakis(pentafluorophenyl)borate, Dimethylanilinium tetrakis(3,5-$(CF_3)_2$phenyl)borate, Triphenylcarbenium tetrakis(3,5-$(CF_3)_2$phenyl)borate, Dimethylanilinium tetrakis(perfluoronapthyl)borate, Triphenylcarbenium tetrakis(perfluoronapthyl)borate, Dimethylanilinium tetrakis(pentafluorophenyl)aluminate, Triphenylcarbenium tetrakis(pentafluorophenyl)aluminate, Dimethylanilinium tetrakis(perfluoronapthyl)aluminate, Triphenylcarbenium tetrakis(perfluoronapthyl)aluminate, a tris(perfluorophenyl) boron, a tris(perfluoronaphthyl)boron, tris(perfluorophenyl) aluminum, a tris(perfluoronaphthyl)aluminum or any combinations thereof.

Aluminoxanes can be described as oligomeric aluminum compounds having —Al(R)—O-subunits, where R is an alkyl group. Examples of aluminoxanes include, but are not limited to, methylaluminoxane ("MAO"), modified methylaluminoxane ("MMAO"), ethylaluminoxane, isobutylaluminoxane, or a combination thereof. Aluminoxanes can be produced by the hydrolysis of the respective trialkylaluminum compound. MMAO can be produced by the hydrolysis of trimethylaluminum and a higher trialkylaluminum, such as triisobutylaluminum. There are a variety of known methods for preparing aluminoxane and modified aluminoxanes. The aluminoxane can include a modified methyl aluminoxane ("MMAO") type 3A (commercially available from Akzo Chemicals, Inc. under the trade name Modified Methylaluminoxane type 3A, discussed in U.S. Pat. No. 5,041,584). A source of MAO can be a solution having from about 1 wt. % to about a 50 wt. % MAO, for example. Commercially available MAO solutions can include the 10 wt. % and 30 wt. % MAO solutions available from Albemarle Corporation, of Baton Rouge, La.

One or more organo-aluminum compounds, such as one or more alkylaluminum compound, can be used in conjunction with the aluminoxanes. Examples of alkylaluminum compounds include, but are not limited to, diethylaluminum ethoxide, diethylaluminum chloride, diisobutylaluminum hydride, and combinations thereof. Examples of other alkylaluminum compounds, e.g., trialkylaluminum compounds include, but are not limited to, trimethylaluminum, triethylaluminum ("TEAL"), triisobutylaluminum ("TiBAl"), tri-n-hexylaluminum, tri-n-octylaluminum, tripropylaluminum, tributylaluminum, and combinations thereof.

The metallocene olefin polymerization catalyst can be any metallocene olefin polymerization catalyst. In one or more embodiments, the metallocene olefin polymerization catalyst is selected from the group consisting of: (pentamethylcyclopentadienyl)(propylcyclopentadienyl)$MX_2$, (tetramethylcyclopentadienyl)(propylcyclopentadienyl)$MX_2$, (tetramethylcyclopentadienyl)(but ylcyclopentadienyl) $MX_2$, $Me_2Si$(indenyl)$_2MX_2$, $Me_2Si$(tetrahydroindenyl)$_2MX_2$, (n-propyl cyclopentadienyl)$_2MX_2$, (n-propylcyclopentadienyl)$_2MX_2$, (n-butylcyclopentadienyl)$_2MX_2$, (1-methyl,3-n-butyl-cyclopentadienyl)$_2MX_2$, (cyclopentadienyl)(1,3-dimethyl-tetrahydroindenyl)$MX_2$, (methylcyclopentadienyl)(1,3-dimethyl-tetrahydroindenyl)$MX_2$, (cyclopentadienyl)(1,5-dimethylindenyl)$MX_2$, (methylcyclopentadienyl)(1,5-di methyl indenyl)$MX_2$, (cyclopentadienyl)(1,4-dimethylindenyl)$MX_2$, (methylcyclopentadienyl)(1,4-dimethylindenyl)$MX_2$, (cyclopentadienyl)(1,7-dimethylindenyl)$MX_2$, (methylcyclopentadienyl)(1,7-dimethylindenyl)$MX_2$, and mixtures thereof, where M is Zr or Hf, and X is selected from F, Cl, Br, I, Me, benzyl, $CH_2SiMe_3$, and ($C_1$ to $C_5$)alkyls or alkenyls.

A gas-phase polymerization catalyst system comprising a metallocene olefin polymerization catalyst; and a gas-phase biphenylphenol polymerization catalyst made from a gas-phase biphenylphenol polymerization precatalyst, can be utilized to make a polymer. For instance, the gas-phase polymerization catalyst system and an olefin can be contacted under polymerization conditions in a gas-phase polymerization reactor to make a polymer, e.g., a polyolefin polymer.

As used herein a "polymer" has two or more of the same or different polymer units derived from one or more different monomers, e.g., homopolymers, copolymers, terpolymers, etc. A "homopolymer" is a polymer having polymer units that are the same. A "copolymer" is a polymer having two or more polymer units that are different from each other. A "terpolymer" is a polymer having three polymer units that are different from each other. "Different" in reference to polymer units indicates that the polymer units differ from each other by at least one atom or are different isomerically. Accordingly, the definition of copolymer, as used herein, includes terpolymers and the like. As used herein a "polymerization process" is a process that is utilized to make a polymer.

Embodiments provide that the polymer can be a polyolefin polymer. As used herein an "olefin," which may be referred to as an "alkene," refers to a linear, branched, or cyclic compound including carbon and hydrogen and having at least one double bond. As used herein, when a polymer or copolymer is referred to as comprising, e.g., being made from, an olefin, the olefin present in such polymer or copolymer is the polymerized form of the olefin. For example, when a copolymer is said to have an ethylene content of 1 wt % to 99 wt %, it is understood that the polymer unit in the copolymer is derived from ethylene in the polymerization reaction and the derived units are present at 1 wt % to 99 wt %, based upon the total weight of the polymer. A higher α-olefin refers to an α-olefin having 3 or more carbon atoms.

Polyolefins include polymers made from olefin monomers such as ethylene, i.e., polyethylene, and linear or branched higher alpha-olefin monomers containing 3 to 20 carbon atoms. Examples of higher alpha-olefin monomers include, but are not limited to, propylene, 1-butene, 1-pentene, 1-hexene, 4-methyl-1-pentene, 1-octene, and 3,5,5-trimethyl-1-hexene. Examples of polyolefins include ethylene-based polymers, having at least 50 wt % ethylene, including ethylene-1-butene, ethylene-1-hexene, and ethylene-1-octene copolymers, among others. Other olefins that may be utilized include ethylenically unsaturated monomers, diolefins having 4 to 18 carbon atoms, conjugated or nonconjugated dienes, polyenes, vinyl monomers and cyclic olefins, for example. Examples of the monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In a number of embodiments, a copolymer of ethylene can be produced, where with ethylene, a comonomer having at least one alpha-olefin having from 4 to 15 carbon atoms, preferably from 4 to 12 carbon atoms, and most preferably from 4 to 8 carbon atoms, is polymerized, e.g., in a gas phase polymerization process. In another embodiment, ethylene and/or propylene can be polymerized with at least two different comonomers, optionally one of which may be a diene, to make a terpolymer.

One or more embodiments provide that the polymer can include from 1 to 100 wt % of units derived from ethylene based on a total weight of the polymer. All individual values and subranges from 1 to 100 wt % are included; for example, the polymer can include from a lower limit of 1, 5, 10, or 50 wt % of units derived from ethylene to an upper limit of 100, 95, 90, 85, or 75 wt % of units derived from ethylene based on the total weight of the polymer.

The gas-phase polymerization catalyst system including a gas-phase biphenylphenol polymerization catalyst made from a gas-phase biphenylphenol polymerization precatalyst of Formula I can help to provide polymers via a polymerization process in a single gas-phase reactor. In one or more embodiments, the resultant polymers can have at least a high molecular weight polyethylene component and a low molecular weight polyethylene component, as detailed herein. In one or more embodiments the resultant polymer can be a multimodal polymer such as a bimodal polyethylene composition comprising a high molecular weight polyethylene component and a low molecular weight polyethylene component, where the high and low molecular weight polyethylene components are formed together in a single gas-phase reactor via a polymerization process employing the gas-phase polymerization catalyst system. Having a high molecular weight polyethylene component and a low molecular weight polyethylene component is desirable in some applications.

Surprisingly, the gas-phase polymerization catalyst system including a gas-phase biphenylphenol polymerization catalyst made from a gas-phase biphenylphenol polymerization precatalyst of Formula I of the disclosure can make polymers including high molecular weight polyethylene components that has a lower molecular weight as compared to high molecular weight components in polymers formed with other (non-inventive) polymerization catalysts at similar polymerization conditions, as detailed herein. High molecular weight polyethylene components having a lower molecular weight than other high molecular weight polyethylene components are desirable in some applications.

Embodiments provide that the polymer can have an Mn (number average molecular weight) from 8,000 to 250,000. All individual values and subranges from 8,000 to 250,000 are included; for example, the polymer can have an Mn from a lower limit of 8,000; 10,000; or 12,000; to an upper limit of 250,000; 150,000; 100,000, 40,000; or 35,000. In some embodiments the Mn can be in a range from 12,702 to 245,010.

Embodiments provide that the polymer can have a Mw (weight average molecular weight) from 50,000 to 1,200,000 at B-conditions and/or a molecular weight of less than 500,000 Daltons at K-conditions. All individual values and subranges from 50,000 to 1,200,000 are included; for example, the polymer can have al Mw from a lower limit of 50,000; 100,000; or 200,000; to an upper limit of U.S. Pat. Nos. 1,200,000; 1,100,000; 1,000,000; 800,000 or 600,000 at B-conditions. Some embodiments provide that the polymer can have a Mw (weight average molecular weight) from 50,000 to 800,000 at B-conditions and/or a molecular weight of less than 500,000 Daltons at K-conditions. All individual values and subranges from 50,000 to 800,000 are included; for example, the polymer can have a Mw from a lower limit of 50,000; 100,000; or 200,000; to an upper limit of 800,000; or 600,000 at B-conditions. In some examples the polymer can have a Mw from 50,000 to 500,000 at K-conditions or from 100,000 to 500,000 at K-conditions.

Embodiments provide that the polymer can have a Mz (z-average molecular weight) from 200,000 to 10,000,000. All individual values and subranges from 200,000 to 10,000,000 are included; for example, the polymer can have a Mz from a lower limit of 200,000; 700,000; or 900,000; to an upper limit of 10,000,000; 5,000,000; or 3,000,000.

Embodiments provide that the polymer can have a Mz to Mw ratio in a range of from 2.00 to 20.00. All individual values and subranges from 2.00 to 20.00 are included; for example, the polymer can have a Mz to Mw ratio from a lower limit of 2.00; 3.00; or 4.00 to an upper limit of 20.00, 15.00, or 10.00.

In some embodiments, the polymer can have a value of Mw to Mn ratio that is greater than 2.00, greater than 3.00, greater than 4.00, or greater than 5.00. Some embodiments provide that the polymer can have an Mw to Mn ratio in a range of from 5.00 to 75.00. All individual values and subranges from 5.00 to 75.00 are included; for example, the polymer can have a Mw to Mn ratio from a lower limit of 5.00; 6.00; or 7.00 to an upper limit of 75.00, 60.00, or 50.00.

Embodiments provide that the polymer can have a Mz to Mw ratio that is less than a Mw to Mn ratio of the polymer.

Embodiments provide that the polymer can have a melt index ($I_{21}$) as measured by ASTM D1238 (at 190° C., 21 kg load) in the range from 0.001 dg/1 min to 1000 dg/1 min. All individual values and subranges from 0.001 dg/1 min to 1000 dg/1 min are included.

Embodiments provide that the polymer made utilizing a gas-phase polymerization reactor can have melt temperature (Tm) from 110 to 135 degrees Celsius (° C.). All individual values and subranges from 118 to 135° C. are included; for example, the polymer can have a Tm from a lower limit of 110, 113, 118, 119, or 120 to an upper limit of 135, 133, 132, 130, or 128° C.

Embodiments provide that the polymer can have a density of from 0.890 g/cm$^3$ to 0.970 g/cm$^3$. All individual values and subranges from 0.890 to 0.970 g/cm$^3$ are included; for example, the polymer can have a density from a lower limit of 0.890, 0.900, 0.910, 0.920, or 0.940 g/cm$^3$ to an upper limit of 0.970, 0.960, or 0.950 g/cm$^3$. Density can be determined in accordance with ASTM D-792-13, Standard Test Methods for Density and Specific Gravity (Relative Density) of Plastics by Displacement, Method B (for testing solid plastics in liquids other than water, e.g., in liquid 2-propanol). Report results in units of grams per cubic centimeter (g/cm$^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 µm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (µL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: $c=K_{DRI}I_{DRI}/(dn/dc)$, wherein $K_{DRI}$ is a constant determined by calibrating the DRI, /indicates division, and do/dc is the refractive index increment for the polymer. For polyethylene, do/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog (MW) on the y-axis versus Log(MW) on the x-axis to give a GPC chromatogram, wherein Log(MW) and dW/dLog (MW) are as defined above.

The polymer can be utilized for a number of articles such as films, fibers, nonwoven and/or woven fabrics, extruded articles, and/or molded articles, among others.

Provided is gas-phase polymerization catalyst system to make a polymer via a gas-phase polymerization process, the gas-phase polymerization catalyst comprising: a metallocene olefin polymerization catalyst; and the supported gas-phase biphenylphenol polymerization catalyst made from the gas-phase biphenylphenol polymerization precatalyst of Formula I, as detailed herein.

The metallocene olefin polymerization catalyst and/or a gas-phase biphenylphenol polymerization catalyst made from a gas-phase biphenylphenol polymerization precatalyst of Formula I, as well as other components discussed herein such as the activator, may be utilized with a support. A "support", which may also be referred to as a "carrier", refers to any support material, including a porous support material, such as talc, inorganic oxides, and inorganic chlorides.

The metallocene olefin polymerization catalyst and/or a gas-phase biphenylphenol polymerization catalyst made from a gas-phase biphenylphenol polymerization precatalyst of Formula I, as well as other components discussed herein, can be supported on the same or separate supports, or one or more of the components may be used in an unsupported form. Utilizing the support may be accomplished by any technique used in the art. One or more embodiments provide that a spray dry process is utilized. Spray dry processes are well known in the art. The support may be functionalized.

The support may be a porous support material, for example, talc, an inorganic oxide, or an inorganic chloride. Other support materials include resinous support materials, e.g., polystyrene, functionalized or crosslinked organic supports, such as polystyrene divinyl benzene polyolefins or polymeric compounds, zeolites, clays, or any other organic or inorganic support material and the like, or mixtures thereof.

Support materials include inorganic oxides that include Group 2, 3, 4, 5, 13 or 14 metal oxides. Some preferred supports include silica, fumed silica, alumina, silica-alumina, and mixtures thereof. Some other supports include magnesia, titania, zirconia, magnesium chloride, montmorillonite, phyllosilicate, zeolites, talc, clays) and the like. Also, combinations of these support materials may be used, for example, silica-chromium, silica-alumina, silica-titania and the like. Additional support materials may include porous acrylic polymers, nanocomposites, aerogels, spherulites, and polymeric beads.

An example of a support is fumed silica available under the trade name Cabosil™ TS-610, or other TS- or TG-series supports, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 $m^2/g$, pore volume in the range of from about 0.1 to about 4.0 $g/cm^3$ and average particle size in the range of from about 5 to about 500 μm. More preferably, the surface area of the support material is in the range of from about 50 to about 500 $m^2/g$, pore volume of from about 0.5 to about 3.5 $g/cm^3$ and average particle size of from about 10 to about 200 μm. Most preferably the surface area of the support material is in the range is from about 100 to about 400 $m^2/g$, pore volume from about 0.8 to about 3.0 $g/cm^3$ and average particle size is from about 5 to about 100 μm. The average pore size of the carrier typically has pore size in the range of from 10 to I000 A, preferably 50 to about 500 A, and most preferably 75 to about 350 A.

The metallocene olefin polymerization catalyst and/or a gas-phase biphenylphenol polymerization catalyst made from a gas-phase biphenylphenol polymerization precatalyst of Formula I, as well as other components discussed herein such as the activator, may be slurried. Slurries are well known in the art. The slurry may include the metallocene olefin polymerization catalyst and/or a gas-phase biphenylphenol polymerization catalyst made from a gas-phase biphenylphenol polymerization precatalyst of Formula I, an activator, and a support, for instance.

A molar ratio of metal in the activator to metal in a metallocene olefin polymerization catalyst or the gas-phase biphenylphenol polymerization catalyst made from a gas-phase biphenylphenol polymerization precatalyst of Formula I in the slurry may be 20,000:1 to 0.5:1, 20,000:1 to 2000:1, 20,000:1 to 5,000:1, 20,000:1 to 10,000:1, 1000:1 to 0.5:1, 300:1 to 1:1, or 150:1 to 1:1. One or more diluents, e.g., fluids, can be used to facilitate the combination of any two or more components in the slurry. For example, the metallocene olefin polymerization catalyst and/or a gas-phase biphenylphenol polymerization catalyst made from a gas-phase biphenylphenol polymerization precatalyst of Formula I, and the activator can be combined together in the presence of toluene or another non-reactive hydrocarbon or hydrocarbon mixture. In addition to toluene, other suitable diluents can include, but are not limited to, ethylbenzene, xylene, pentane, hexane, heptane, octane, other hydrocarbons, or any combination thereof. The support, either dry or mixed with toluene can then be added to the mixture or the metal-ligand complex/activator can be added to the support. The slurry may be fed to the reactor for the polymerization process, and/or the slurry may be dried, e.g., spray-dried, prior to being fed to the reactor for the polymerization process.

As mentioned, the polymerization process may be a gas-phase polymerization process via a gas-phase polymerization reactor. The polymerization process may utilize known equipment and reaction conditions, e.g., known polymerization conditions. As an example, polymerization temperatures may range from about 0° C. to about 300° C. at atmospheric, sub-atmospheric, or super-atmospheric pressures. Embodiments provide a method of making a polyolefin polymer the method comprising: contacting, under polymerization conditions, an olefin with the gas-phase polymerization catalyst system, as described herein, to polymerize the olefin, thereby making a polyolefin polymer.

One or more embodiments provide that the polymers may be formed via a gas phase polymerization system, at super-atmospheric pressures in the range from 0.07 to 68.9 bar, from 3.45 to 27.6 bar, or from 6.89 to 24.1 bar, and a temperature in the range from 30° C. to 130° C., from 65° C. to 110° C., from 75° C. to 120° C., or from 80° C. to 120° C. Stirred and/or fluidized bed gas phase polymerization systems may be utilized.

Generally, a conventional gas phase fluidized bed polymerization process can be conducted by passing a stream containing one or more olefin monomers continuously through a fluidized bed reactor under reaction conditions and in the presence of a catalytic composition, e.g., a composition including the gas-phase polymerization catalyst system (a metallocene olefin polymerization catalyst and a gas-phase biphenylphenol polymerization catalyst made from a gas-phase biphenylphenol polymerization precatalyst of Formula I) and the activator, at a velocity sufficient to maintain a bed of solid particles in a suspended state. A stream comprising unreacted monomer can be continuously withdrawn from the reactor, compressed, cooled, optionally partially or fully condensed, and recycled back to the reactor. Product, i.e., polymer, can be withdrawn from the reactor and replacement monomer can be added to the recycle stream. Gases inert to the catalytic composition and reactants may also be present in the gas stream. The polymerization system may include a single reactor or two or more reactors in series, for example.

Feed streams for the polymerization process may include olefin monomer, non-olefinic gas such as nitrogen and/or hydrogen, and may further include one or more non-reactive alkanes that may be condensable in the polymerization process and used for removing the heat of reaction. Illustrative non-reactive alkanes include, but are not limited to, propane, butane, isobutane, pentane, isopentane, hexane, isomers thereof and derivatives thereof. Feeds may enter the reactor at a single or multiple and different locations.

For the polymerization process, polymerization catalyst (a metallocene olefin polymerization catalyst and/or a gas-phase biphenylphenol polymerization catalyst made from a gas-phase biphenylphenol polymerization precatalyst of Formula I) may be continuously fed to the reactor. A gas that is inert to the polymerization catalyst, such as nitrogen or argon, can be used to carry the polymerization catalyst into the reactor bed.

For the polymerization process, hydrogen may be utilized at a gas mole ratio of hydrogen to ethylene in the reactor that can be in a range of about 0.0 to 3.5, 0.0 to 1.0, in a range of 0.01 to 0.7, in a range of 0.03 to 0.5, in a range of 0.005 to 0.3, or in a range in a range of 0.0017 to 0.0068. A number of embodiments utilize hydrogen gas.

A number of aspects of the present disclosure are provided as follows.

Aspect 1 provides a use of a supported gas-phase biphenylphenol polymerization catalyst to make a polymer via a gas-phase polymerization process, where the supported gas-phase biphenylphenol polymerization catalyst is made from a gas-phase biphenylphenol polymerization precatalyst of Formula I:

(Formula I)

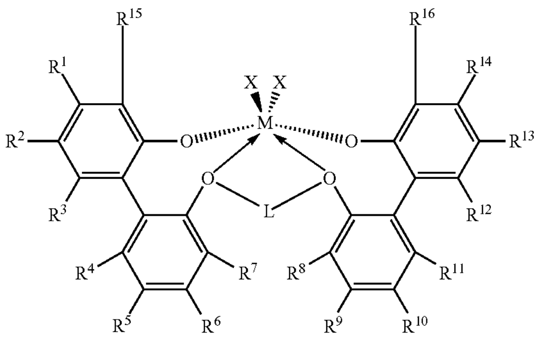

where each of $R^5$, $R^7$, $R^8$, and $R^{10}$ is independently is a ($C_1$ to $C_{20}$)alkyl, aryl, aralkyl, halogen, or a hydrogen; where each of $R^4$ and $R^{11}$ independently is a halogen or a hydrogen; where each of $R^2$ and $R^{13}$ independently is a ($C_1$ to $C_{20}$) alkyl, aryl or aralkyl or a hydrogen; where each of $R^{15}$ and $R^{16}$ independently is a 2,7-disubstituted carbazol-9-yl or a 3,6-disubstituted carbazol-9-yl; where L is a linear $C_3$ or $C_4$ alkylene that forms a 3-carbon bridge or 4-carbon bridge, respectively, between the two oxygen atoms to which L is covalently bonded; where each of $R^1$, $R^3$, $R^{12}$, and $R^{14}$ independently is a ($C_1$-$C_8$)alkyl, halogen, or a hydrogen; where each of $R^6$ and $R^9$ is a hydrogen or ($C_1$-$C_8$)alkyl; where each X independently is a halogen, a hydrogen, a ($C_1$-$C_{20}$)alkyl, a ($C_7$-$C_{20}$)aralkyl, a ($C_1$-$C_6$)alkyl-substituted ($C_6$-$C_{12}$)aryl, or a ($C_1$-$C_6$)alkyl-substituted benzyl, —$CH_2Si(R^C)_3$, where $R^C$ is ($C_1$-$C_{12}$)hydrocarbon; and where M is Zr or Hf.

Aspect 2 provides the use of Aspect 1, where each X is a methyl.

Aspect 3 provides the use of Aspect 1 or 2, where each of $R^1$, $R^3$, $R^{12}$, and $R^{14}$ is a hydrogen.

Aspect 4 provides the use of Aspect 1, 2 or 3, where the gas-phase biphenylphenol polymerization precatalyst of Formula I is selected from a group consisting of the structures of (i), (ii), (iii), (iv), (v), (vi), (vii), (viii) and (ix), as detailed herein.

Aspect 5 provides the use of Aspect 1, 2 or 3, where the gas-phase biphenylphenol polymerization precatalyst is selected from a group consisting of the structures of (iii) and (v), as detailed herein.

Aspect 6 provides the use of Aspect 1, wherein the polymer formed at B-conditions ($H_2/O_2$=0.0017 and $C_6/O_2$=0.004 at 100° C. and 230 pounds per square inch (psi) ethylene) has a molecular weight (Mw) in a range of from about 150,000 Daltons to about 1,200,000 Daltons; or wherein the polymer formed at K-conditions ($H_2/O_2$=0.0068 and $C_6/O_2$=0.004 at 100° C. and 230 psi) has Mw of less than about 500,000 Daltons. That is, in one or more embodiments the polymer has a molecular weight in a range of from about 150,000 daltons to about 1,200,000 daltons at B-conditions and a molecular weight of less than about 500,000 at K-conditions.

Aspect 7 provides a gas-phase polymerization catalyst system to make a polymer via a gas-phase polymerization process, the gas-phase polymerization catalyst comprising: a metallocene olefin polymerization catalyst; and the supported gas-phase biphenylphenol polymerization catalyst made from the gas-phase biphenylphenol polymerization precatalyst of Aspect 1. In various embodiments, part or all of a gas-phase polymerization catalyst system (e.g., the metallocene and/or the gas-phase biphenylphenol polymerization precatalyst) is provided as a trim solution. For example, a portion of the metallocene catalyst may be provided as a trim solution. Alternatively, a portion of the gas-phase biphenylphenol polymerization precatalyst may be provided as a trim solution.

Aspect 8 provides a gas-phase polymerization method to make a polymer, the method comprising: polymerizing an olefin monomer in a gas-phase polymerization reactor in presence of the gas-phase polymerization catalyst system of Aspect 7 to make the polymer.

Aspect 9 provides the gas-phase polymerization catalyst system of Aspect 7 or the gas-phase polymerization method of Aspect 8, where each of $R^{15}$ and $R^{16}$ is a 3,6-di-t-butylcarbazol-9-yl.

Aspect 10 provides a polyethylene composition comprising a high molecular weight polyethylene component and a low molecular weight polyethylene component, where the high and low molecular weight polyethylene components are made together in a single gas-phase reactor via a polymerization process employing the gas-phase polymerization catalyst system of Aspect 7.

EXAMPLES

Gas-phase biphenylphenol polymerization catalysts made from the gas-phase biphenylphenol polymerization precatalyst of Formula (I), gas-phase polymerization catalyst systems including the gas-phase biphenylphenol polymerization catalysts, and comparative gas-phase polymerization catalysts (other than those made from gas-phase polymerization precatalyst of Formula (I) were prepared as follows.

Gas-phase biphenylphenol polymerization precatalyst of structure (i) was prepared as follows. In a glove box, a 16 oz oven-dried glass jar was charged with hafnium chloride [HfCl4] (12.07 g, 37.7 mmol; available from Strem Chemical) and toluene (300 mL; available from Fisher Scientific) and a magnetic stir bar. The contents of the jar were cooled to approximately −30 degrees Celsius (° C.). The methylmagnesium bromide (56.6 mL of 2.6M solution in diethyl ether, 147 mmol; available from Millipore Sigma) was added and the solution was stirred for 15 minutes at −30° C. The jar was charged with a ligand of structure A (56.00 g, 35.9 mmol). The ligand of structure A was prepared as described in WO 2017/058,981, and the entire contents of WO 2017/058,981 are incorporated herein by reference. The contents of the vial were allowed to stir for 3 hours as the solution gradually warmed to room temperature. The mixture was filtered and the solvent was removed in vacuo from the filtrate to obtain a gray powder (45 g, 71.0% yield). The presence of the gas-phase biphenylphenol polymerization precatalyst of structure (i) was confirmed by $^1H$ NMR analysis. $^1H$ NMR (400 MHz, Benzene-$d_6$) δ 8.19 (d, 2H), 8.01 (s, 2H), 7.99 (d, 2H), 7.89 (d, 2H), 7.74 (s, 2H), 7.64 (d, 2H), 7.55 (s, 2H), 7.51 (dd, 2H), 7.31 (dd, 2H), 7.06 (m, 2H), 3.68 (m, 2H), 3.42 (m, 2H), 1.79 (d, 2H), 1.67 (d, 2H), 1.60 (s, 18H), 1.47 (s, 6H), 1.42 (s, 6H), 1.35 (s, 6H), 1.33-1.25 (m, 26H), 1.25 (s, 18H), 0.93 (t, 6H), 0.92 (s, 18H), 0.59 (m, 4H), 0.10 (s, 6H), 0.07 (s, 6H), −0.82 (s, 6H).

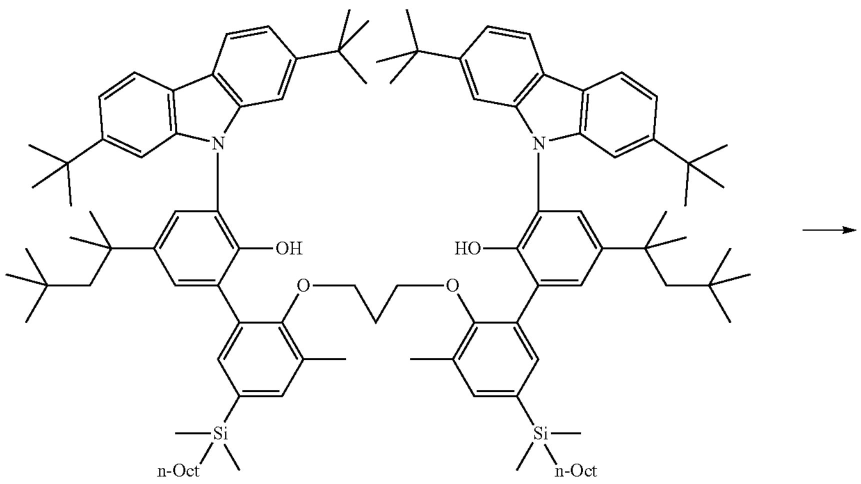

(Structure A)

-continued

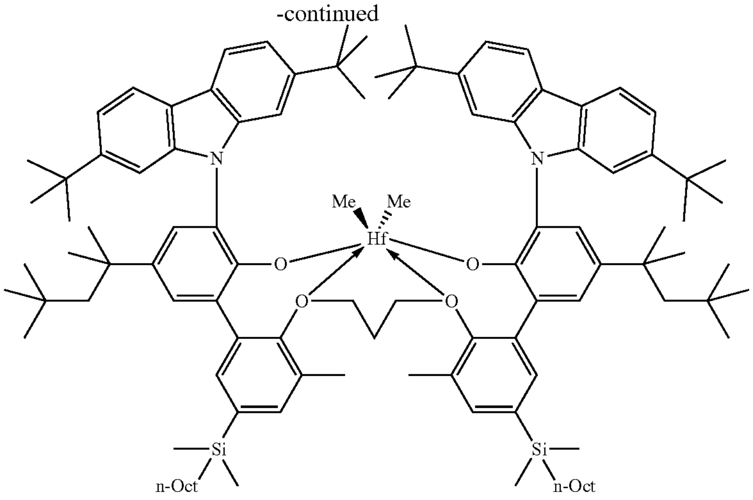

(Structure i)

As used herein, “Me” refers to methyl, “n-Oct” refers to n-$C_8H_{17}$, and “n-Pr” refers to n-$C_3H_7$.

Gas-phase biphenylphenol polymerization precatalyst of structure (ii) was prepared using the same components and methodology as the gas-phase biphenylphenol polymerization precatalyst of structure (i), but with the use of zirconium chloride [ZrCl4] (15.0 g, 64.1 mmol) instead of hafnium chloride (99.9 g; 92.9% yield). The presence of the gas-phase biphenylphenol polymerization precatalyst of structure (ii) was confirmed by $^1$H NMR analysis. $^1$H NMR (400 MHz, Benzene-$d_6$) δ 8.19 (d, 2H), 8.01 (s, 2H), 7.99 (d, 2H), 7.87 (d, 2H), 7.79 (d, 2H), 7.65 (d, 2H), 7.57 (d, 2H), 7.51 (dd, 2H), 7.30 (dd, 2H), 7.04 (m, 2H), 3.57 (m, 2H), 3.43 (m, 2H), 1.79 (d, 2H), 1.67 (d, 2H), 1.60 (s, 18H), 1.46 (s, 6H), 1.42 (s, 6H), 1.35 (s, 6H), 1.34-1.25 (m, 26H), 1.25 (s, 18H), 0.94 (t, 6H), 0.93 (s, 18H), 0.60 (m, 4H), 0.11 (s, 6H), 0.08 (s, 6H), −0.63 (s, 6H).

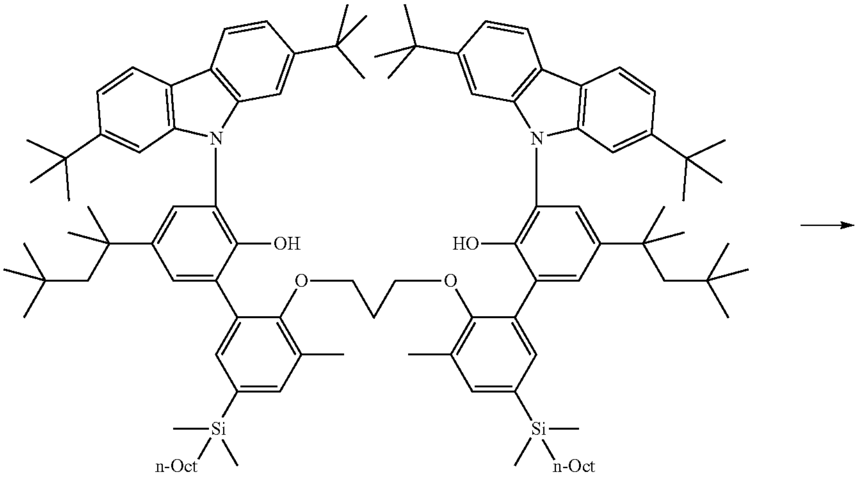

(Structure A)

-continued

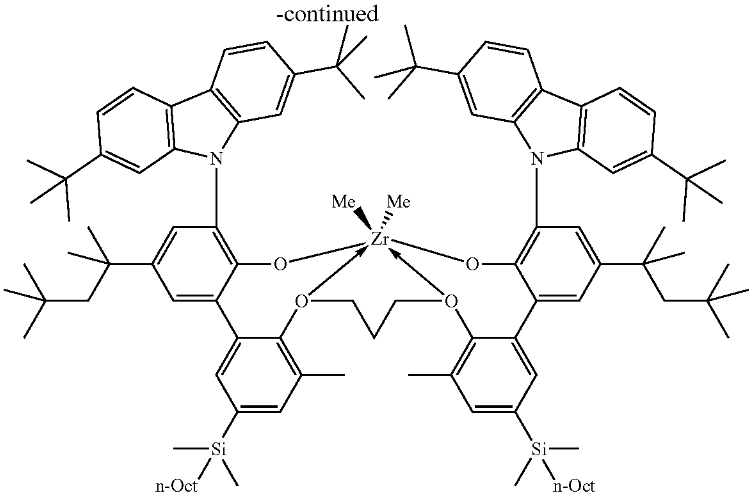

(Structure ii)

Gas-phase biphenylphenol polymerization precatalyst of structure (iii) was prepared as follows. In a glove box, a 4 oz oven-dried glass jar was charged with zirconium chloride [ZrCl4] (0.186 g, 0.80 mmol; available from Strem Chemical) and toluene (30 mL; available from Fisher Scientific) and a magnetic stir bar. The contents of the jar were cooled to approximately −30 degrees Celsius (° C.). The methylmagnesium bromide (1.12 mL of 3.0M solution in diethyl ether, 3.34 mmol; available from Millipore Sigma) was added and the solution was stirred for 2 minutes at −30° C. The jar was charged with a ligand of structure B (1.00 g, 0.80 mmol). The ligand of structure B was prepared as described in WO 2014/105411, and the entire contents of WO 2014/105411 are incorporated herein by reference. The contents of the vial were allowed to stir for 2 hours as the solution gradually warmed to room temperature. The mixture was filtered and the solvent was removed in vacuo from the filtrate to obtain a gray powder, which was washed with 20 mL hexane and isolated by filtration (0.954 g, 87.1% yield). The presence of the gas-phase biphenylphenol polymerization precatalyst of structure (iii) was confirmed by $^1$H NMR analysis. $^1$H NMR (400 MHz, Benzene-$d_6$) δ 8.20 (d, 2H), 8.09 (d, 2H), 7.90 (d, 2H), 7.82 (d, 2H), 7.80 (d, 2H), 7.50 (dd, 2H), 7.37 (dd, 2H), 7.33 (d, 2H), 6.89 (dd, 2H), 6.12 (dd, 2H), 3.35 (m, 2H), 3.20 (m, 2H), 1.72 (d, 2H), 1.58 (s, 18H), 1.57 (d, 2H), 1.28 (s, 18H), 1.27 (s, 6H), 1.23 (s, 6H), 1.14 (s, 6H), 0.88 (s, 18H), −0.58 (s, 6H).

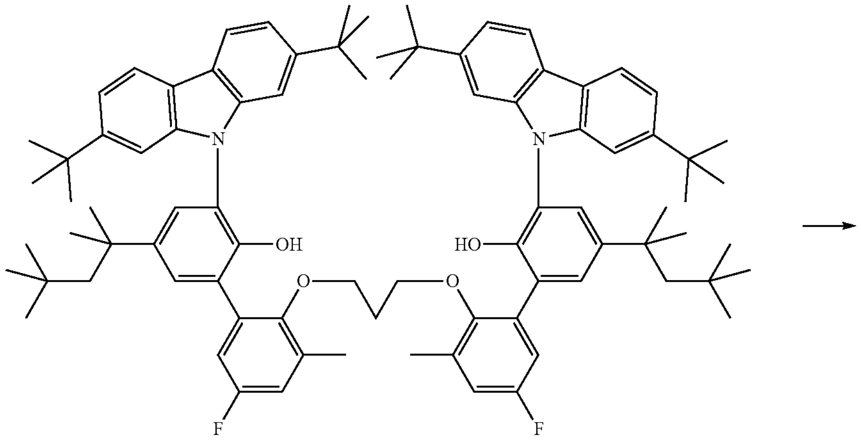

(Structure B)

-continued

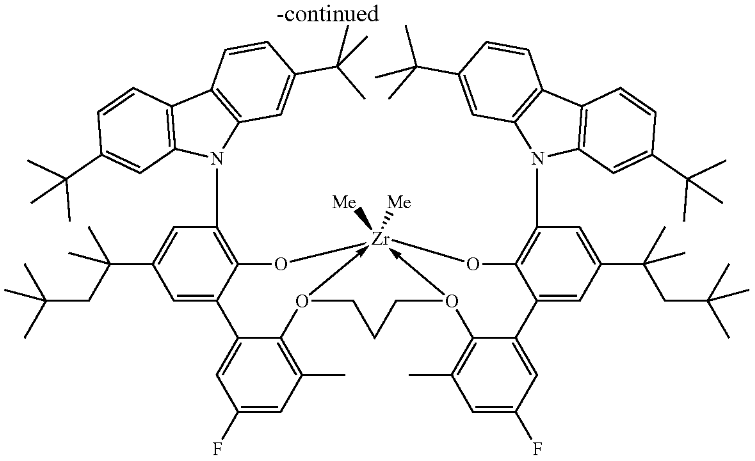

(Structure iii)

Gas-phase biphenylphenol polymerization precatalyst of structure (iv) was prepared as follows. To a suspension of $ZrCl_4$ (102 mg, 0.44 mmol) in toluene (20 mL) at −28 C, was added a 3.22 M solution of methyl magnesium bromide (0.57 mL, 1.83 mmol). The solution was stirred for 2 min during which a deep red color formed. The ligand of structure C (550 mg, 0.44 mmol) was then added in one portion as a solution in toluene (10 mL). The ligand of structure C was prepared as described in 20160108156A1, and the entire contents of 20160108156A1 are incorporated herein by reference. The solution was allowed to warm to room temperature and stirred for a total of 4 hr. Hexane (30 mL) was added and the solution was filtered to remove the insoluble salts. The filtrate was dried under reduced pressure. The crude solid was then taken up in hot toluene (20 mL) and filtered. The filtrate was evaporated under reduced pressure affording 562 mg (93%) of a pale yellow solid. The presence of the gas-phase biphenylphenol polymerization precatalyst of structure (iv) was confirmed by $^1H$ NMR analysis. $^1H$ NMR (400 MHz, $C_6D_6$, 298 K) δ 8.19 (d, J=8.0 Hz, 1H), 8.15 (d, J=8.0 Hz, 2H), 7.73 (s, 1H), 7.66 (s, 1H), 7.60 (d, J=8.0 Hz, 2H), 7.49-7.39 (m, 4H), 7.30 (d, J=8.0 Hz, 1H), 7.20 (s, 1H), d (J=8.0 Hz, 1H), 7.06-7.00 (m, 3H), 6.63 (d, J=8.0 Hz, 1H), 6.22 (dd, J=8.0 Hz and 4.0 Hz, 1H), 5.75 (td, J=8.0 Hz and 4.0 Hz, 1H), 3.62 (t, J=8.0 Hz, 1H), 3.30 (m, 2H), 3.16 (m, 1H), 1.61 (s, 12H), 1.47 (s, 12H), 1.26 (s, 18H), 1.25 (s, 18H), 0.93 (s, 12H), 0.84 (s, 12H), 0.52 (d, 12.0 Hz, 3H), −0.56 (s, 3H), −0.98 (s, 3H).

(Structure C)

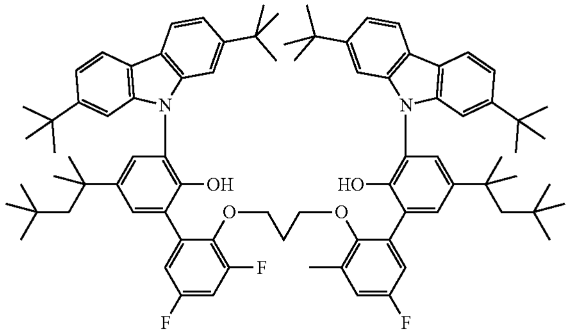

-continued (Structure iv)

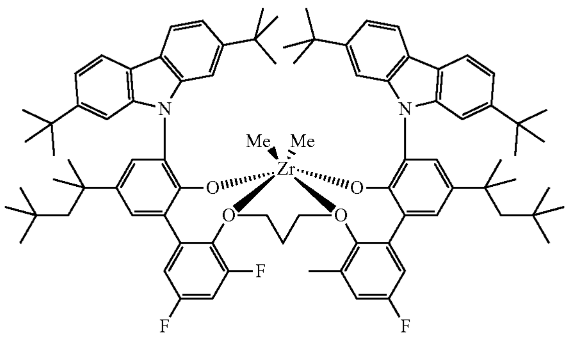

Gas-phase biphenylphenol polymerization precatalyst of structure (v) was prepared as follows. To a suspension of $ZrCl_4$ (104 mg, 0.45 mmol) in toluene (20 mL) at −28 C, was added a 3.22 M solution of methyl magnesium bromide in diethyl ether (0.61 mL, 1.97 mmol). The solution was stirred for 2 min during which a deep red color formed. The ligand of structure D (550 mg, 0.45 mmol) was then added in one portion as a solution in toluene (10 mL). The ligand of structure D was prepared as described in US20160108156 (A1), and the entire contents of US20160108156(A1), are incorporated herein by reference. The solution was allowed to warm to room temperature and stirred for a total of 4 hr. Hexanes (30 mL) was added and the solution was filtered to remove the insoluble salts. The filtrate was dried under reduced pressure affording 600 mg (99%) of a pale yellow solid. The presence of the gas-phase biphenylphenol polymerization precatalyst of structure (v) was confirmed by $^1H$ NMR analysis. $^1H$ NMR (400 MHz, $C_6D_6$, 298 K) δ 8.15 (d, J=8.0 Hz, 2H), 8.07 (dd, J=8.0 and 4.0 Hz, 2H), 7.71 (d, J=4.0 Hz, 2H), 7.68 (d, J=4.0 Hz, 2H), 7.67 (d, J=4.0 Hz, 2H), 7.36 (t, J=4.0 Hz, 2H), 7.33 (t, J=4.0 Hz, 2H), 7.29 (d, J=4.0 Hz, 2H), 7.03-7.01 (m, 3H), 6.99 (d, J=4.0 Hz, 1H), 6.63 (m, 2H), 4.76 (q, J=4.0 Hz, 2H), 3.91 (q, J=4.0 Hz, 2H), 3.39 (q, J=4.0 Hz, 2H), 1.57 (q, J=12.0 Hz, 6H), 1.34 (s, 18H), 1.22 (s, 30H), 0.82 (s, 18H), −0.91 (s, (Structure D)

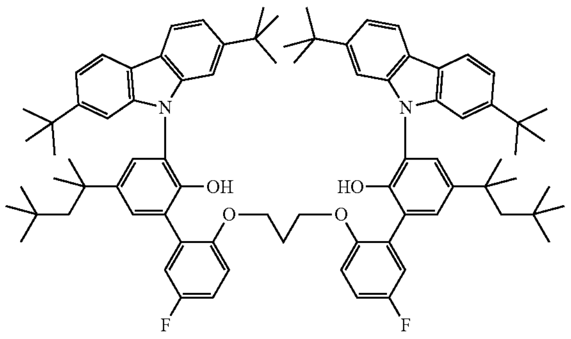

-continued (Structure v)

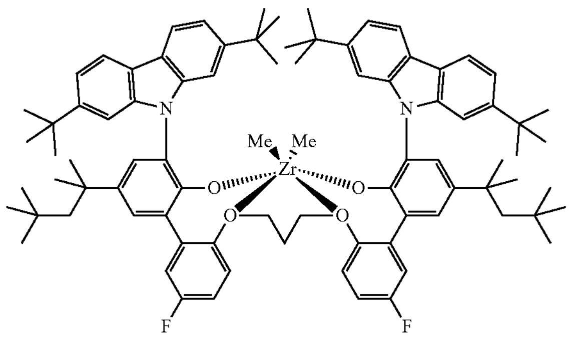

Gas-phase biphenylphenol polymerization precatalyst of structure (vi) was prepared as follows. To a suspension of ZrCl4 (69 mg, 0.30 mmol) in toluene (20 mL) at −28 C, was added a 3.22 M solution of methyl magnesium bromide (0.40 mL, 1.30 mmol). The solution was stirred for 2 min during which time a deep red color formed. The ligand of structure E (513 mg, 0.30 mmol) was then added in one portion as a solution in toluene (10 mL). The ligand of structure E was prepared as described in WO2017058981A1, and the entire contents of WO2017058981A1 are incorporated herein by reference. The solution was allowed to warm to room temperature and stirred for a total of 3 hr. Hexanes (30 mL) was added and the solution was filtered to remove the insoluble salts. The filtrate was dried under reduced pressure affording 495 mg (90%) of a pale yellow solid. The presence of the gas-phase biphenylphenol polymerization precatalyst of structure (vi) was confirmed by $^1$H NMR analysis. $^1$H NMR (400 MHz, $C_6D_6$, 298 K) δ 8.27 (d, J=8.0 Hz, 2H), 8.16 (d, J=8.0 Hz, 2H), 8.05 (s, 2H), 7.96 (s, 2H), 7.63 (d, J=8.0 Hz, 2H), 7.56 (d, J=8.0 Hz, 2H), 6.92 (d, J=4.0 Hz, 2H), 6.79 (d, J=4.0 Hz, 2H), 6.77 (d, J=4.0 Hz, 2H), 6.13 (d, J=4.0 Hz, 1H), 6.11 (d, J=4.0 Hz, 1H), 3.54 (q, J=4.0 Hz, 2H), 3.30 (q, J=4.0 Hz, 2H), 2.13 (s, 6H), 1.66-0.89 (m, 130H), −0.42 (s, 6H).

(Structure E)

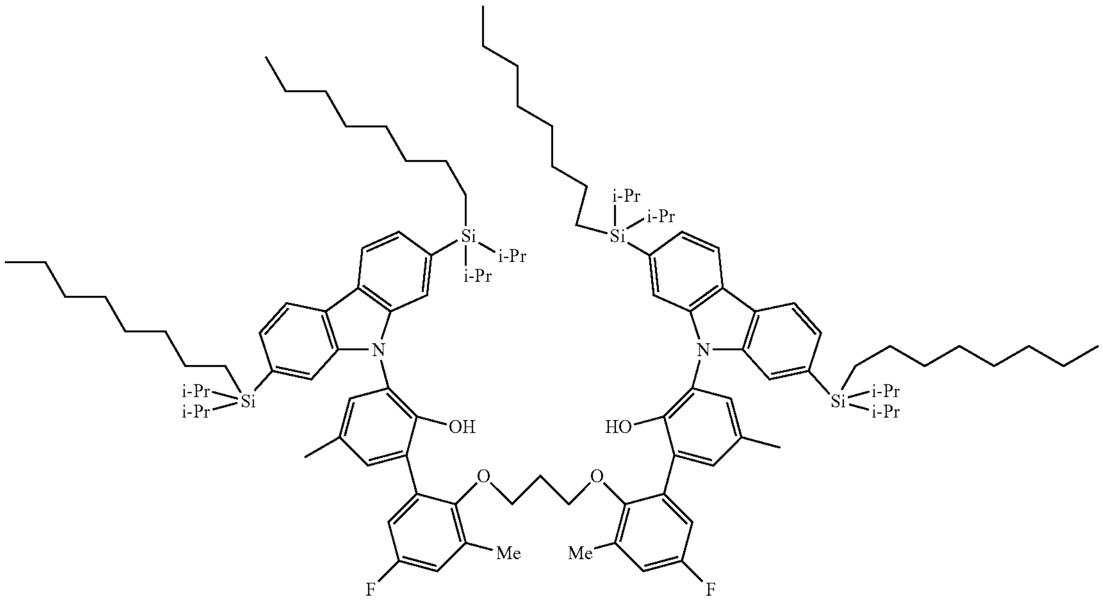

-continued (Structure vi)

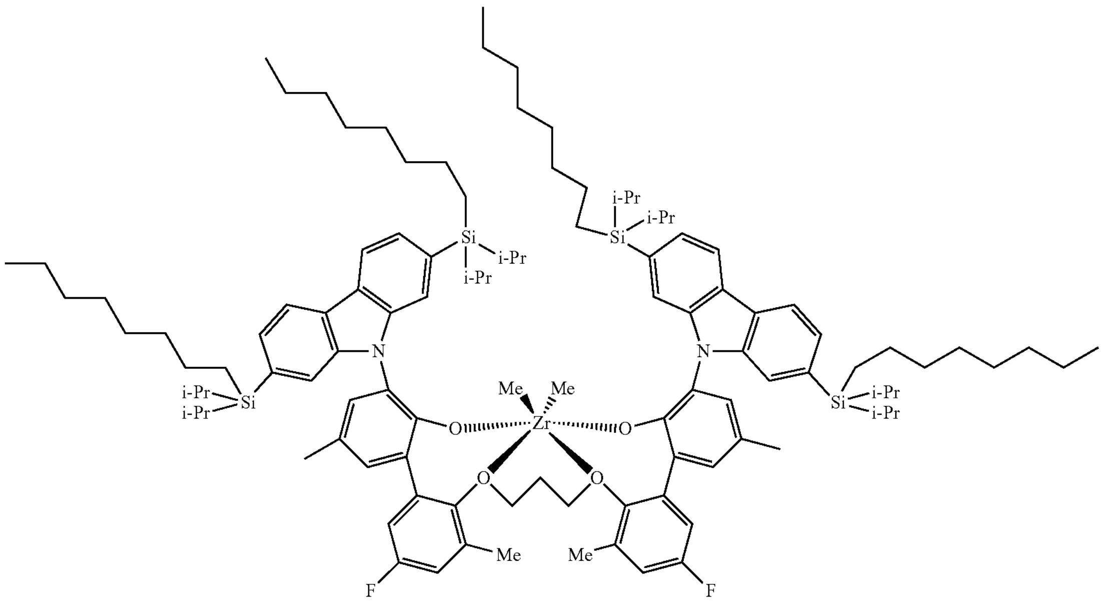

Gas-phase biphenylphenol polymerization precatalyst of Structure (vii) was prepared as follows.

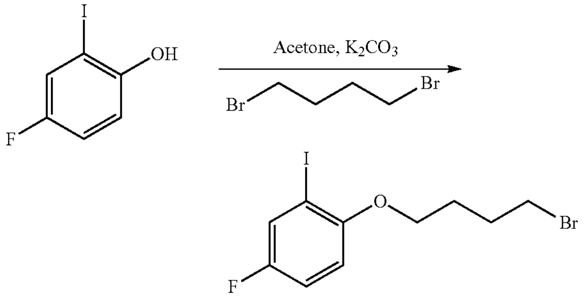

Synthesis of 1-(4-bromobutoxy)-4-fluoro-2-iodobenzene: A three-necked round bottom flask equipped with a stir bar, septa, a condenser, and a nitrogen gas inlet was charged 4-fluoro-2-iodophenol (3.20 g, 13.45 mmol, preparation published on US2015/0291713A1), anhydrous potassium carbonate (3.79 g, 27.45 mmol), 1,4-dibromobutane (28 mL, 234.47 mmol), and acetone (92 mL). The mixture was stirred at reflux for 3 hours and was then allowed to cool to room temperature. The mixture was filtered, the solids were wash with acetone, and the filtrate was concentrated by rotary evaporation to remove acetone. To remove the excess 1,4-dibromobutane, the remaining yellow solution was heated at 60° C. and was distilled under high vacuum using a short path distillation head while slowly increasing the temperature to afford 4.45 g (88.8%) of the product as a light brown oil.

$^1$H-NMR (400 MHz, $CDCl_3$) δ 7.48 (dd, J=7.6, 3.0 Hz, 1H), 7.00 (ddd, J=9.0, 7.8, 3.0 Hz, 1H), 6.71 (dd, J=9.0, 4.6 Hz, 1H), 3.99 (t, J=5.9 Hz, 2H), 3.53 (t, J=6.6 Hz, 2H), 2.18-2.09 (m, 3H), 2.02-1.94 (m, 2H). $^{13}$C-NMR (101 MHz, $CDCl_3$) δ 156.64 (d, J=244.0 Hz), 153.93 (d, J=2.2 Hz), 125.94 (d, J=25.0 Hz), 115.48 (d, J=22.7 Hz), 112.05 (d, J=8.2 Hz), 85.94 (d, J=8.3 Hz), 68.74, 33.54, 29.42, 27.63. $^{19}$F-NMR (376 MHz, $CDCl_3$) δ-122.33 (td, J=7.9, 4.8 Hz).

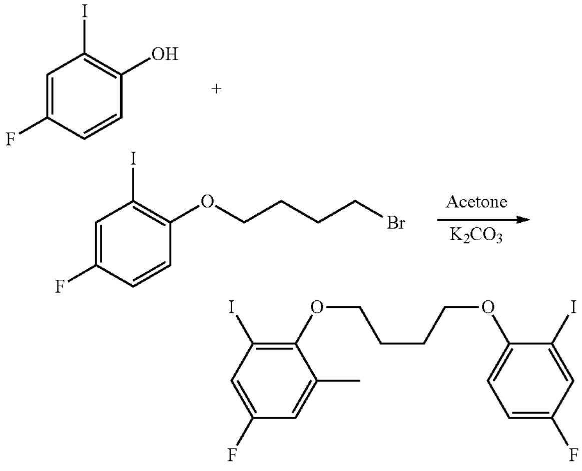

Synthesis of 5-fluoro-2-(2-(4-fluoro-2-iodophenoxy)ethoxy)-1-iodo-3-methylbenzene: A three-necked round bottom flask equipped with a stir bar, septa, a condenser, and a nitrogen gas inlet was charged with 1-(4-bromobutoxy)-4-fluoro-2-iodobenzene (3.66 g, 9.81 mmol), 4-fluoro-2-iodo-6-methylphenol (2.47 g, 9.82 mmol, preparation published on US2015/0291713A1), anhydrous potassium carbonate (2.87 g, 20.76 mmol), and acetone (66 mL). The mixture was stirred at reflux for 5.5 hours and was then allowed to cool to room temperature. The mixture was filtered, the solids were wash with acetone, and the filtrate was concentrated by rotary evaporation to afford a crude dark red oil (5.30 g). The oil dissolved in a minimal amount of hexanes and was purified by flash column chromatography (ISCO, 330 g silica gel, 0-5% ethyl acetate in hexanes). The fractions containing the product were combined and concentrated by rotary evaporation to afford a yellow oil. To remove traces of ethyl acetate, the oil was dissolved in dichloromethane and concentrated by rotary evaporation to afford a yellow oil (repeated twice). The oil was dried under high vacuum to afford 4.33 g (81.2%) of the product as a yellow oil.

$^1$H NMR (400 MHz, $CDCl_3$) δ 7.50 (dd, J=7.6, 3.0 Hz, 1H), 7.31 (ddd, J=7.5, 3.0, 0.7 Hz, 1H), 7.01 (ddd, J=9.0, 7.8, 3.0 Hz, 1H), 6.91-6.85 (m, 1H), 6.76 (dd, J=9.0, 4.6 Hz, 1H), 4.12-4.05 (m, 2H), 3.95-3.88 (m, 2H), 2.32 (s, 2H), 2.14-2.09 (m, 4H). $^{13}$C NMR (101 MHz, $CDCl_3$) δ 158.71 (d, J=168.7 Hz), 156.27 (d, J=165.2 Hz), 154.13 (d, J=1.9 Hz), 153.41 (d, J=1.5 Hz), 133.04 (d, J=8.3 Hz), 125.95 (d, J=24.9 Hz), 123.28 (d, J=24.8 Hz), 117.84 (d, J=22.2 Hz), 115.51 (d, J=22.6 Hz), 112.27 (d, J=8.1 Hz), 91.35 (d, J=9.5 Hz), 86.07 (d, J=8.7 Hz), 72.45 (d, J=1.4 Hz), 69.61, 26.91, 26.00, 17.30 (d, J=1.5 Hz). $^{19}$F NMR (376 MHz, $CDCl_3$) δ-118.22 (t, J=8.1 Hz), −122.40 (td, J=7.6, 4.5 Hz).

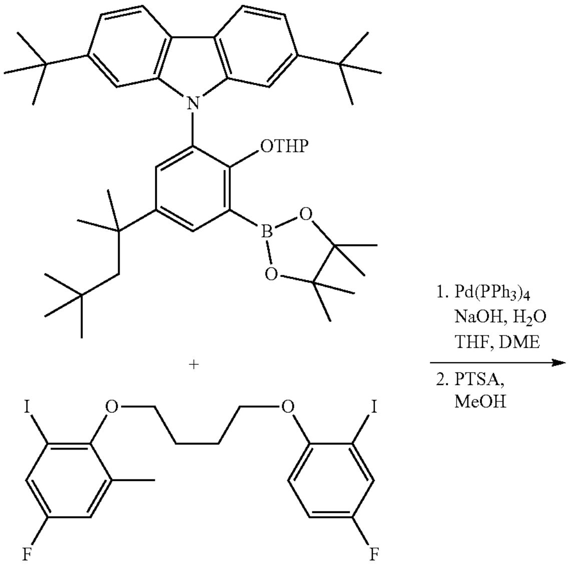

-continued

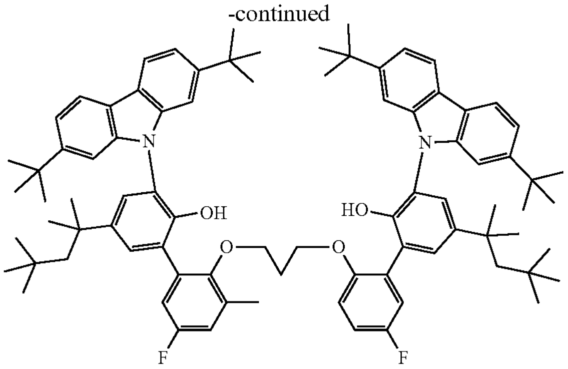

(Structure F)

Reaction was set up in a glove box under nitrogen atmosphere. A jar was charged with zirconium tetrachloride (0.037 g, 0.16 mmol) and toluene (10 mL). The slurry mixture was cooled to −25° C. in the glove box freezer. To the stirring slurry cool mixture was added 3.0 M methylmagnesium bromide in diethyl ether (0.25 mL, 0.75 mmol). The mixture was stirred strongly for about 4 minutes. The solid went in solution and it turned brown. To the mixture was added the ligand of structure F (0.20 g, 0.16 mmol) as a solid. The resulting mixture was stirred at room temperature for 5 hours. To the mixture was then added hexane (10 mL) and filtered. The solution was concentrated under vacuum to afford 0.25 g (full conversion) of the product as a light yellow color solid. Excess mass was attributed to the presence of residual toluene as observed in the proton NMR in combination with full conversion. The presence of the gas-phase biphenylphenol polymerization precatalyst of structure (vii) was confirmed by $^1$H NMR analysis. $^1$H NMR (400 MHz, Benzene-$d_6$) δ 8.18 (d, J=8.2 Hz, 1H), 8.15 (d, J=8.2 Hz, 1H), 8.08 (d, J=8.3 Hz, 1H), 7.88 (d, J=1.7 Hz, 1H), 7.80 (d, J=2.0 Hz, 2H), 7.72 (d, J=1.6 Hz, 2H), 7.69 (d, J=2.5 Hz, 1H), 7.48-7.40 (m, 2H), 7.40-7.34 (m, 3H), 7.23 (d, J=2.5 Hz, 1H), 6.99-6.90 (m, 2H), 6.55 (ddd, J=9.0, 7.1, 3.2 Hz, 1H), 6.14 (dd, J=8.5, 3.2 Hz, 1H), 5.15 (dd, J=9.1, 4.9 Hz, 1H), 4.44 (t, J=11.7 Hz, 1H), 3.91-3.70 (m, 2H), 3.37 (dd, J=11.0, 7.6 Hz, 1H), 1.78 (d, J=14.5 Hz, 1H), 1.68-1.52 (m, 2H), 1.47 (s, 9H), 1.37 (s, 9H), 1.25 (s, 10H), 1.24 (s, 9H), 1.21 (s, 4H), 1.14 (s, 3H), 1.13 (s, 3H), 0.89 (s, 9H), 0.83 (s, 3H), 0.81 (s, 10H), −0.70 (s, 3H), −1.03 (s, 3H).

(Structure vii)

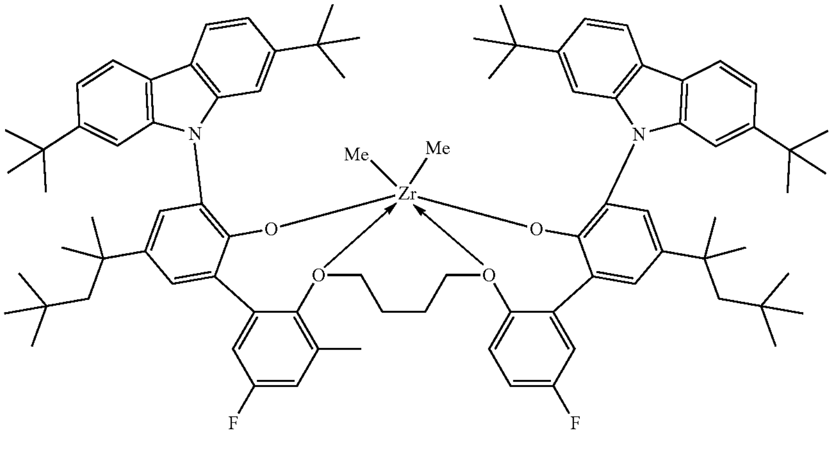

Gas-phase biphenylphenol polymerization precatalyst of Structure (viii) was prepared as described in U.S. Pat. No. 9,000,108B2, and the entire contents of U.S. Pat. No. 9,000,108B2 are incorporated herein by reference.

(Structure viii)

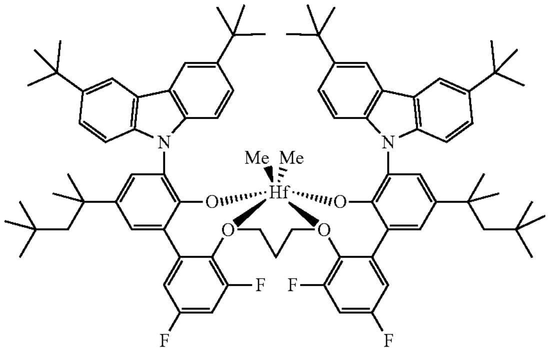

Gas-phase biphenylphenol polymerization precatalyst of structure (ix) was prepared according to the procedure described in U.S. Pat. No. 9,029,487B2, and the entire contents of U.S. Pat. No. 9,029,487B2 are incorporated herein by reference.

(Structure ix)

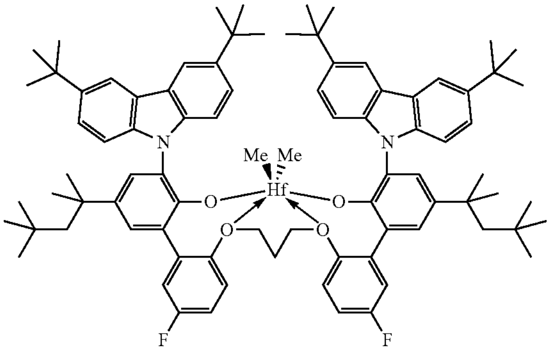

Comparative gas-phase polymerization catalysts (other than those made from gas-phase polymerization precatalyst of Formula (I)) were prepared as follows. The comparative catalysts can include a branched or substituted bridge. For instance, as illustrated in structures (x) and (xi) the comparative catalyst can include a branched or substituted bridge formed between two oxygen atoms.

Comparative polymerization precatalyst of structure (x) was prepared according to the procedure described in US20170137550A1, and the entire contents of US20170137550A1 are incorporated herein by reference.

(Structure x)

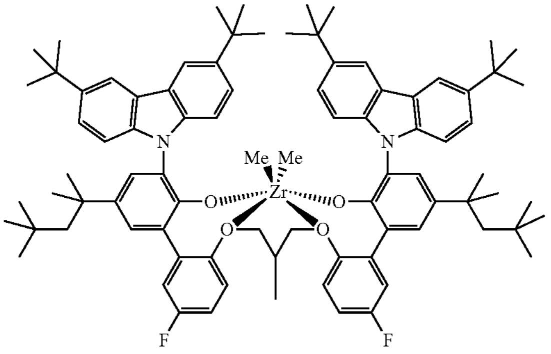

Comparative polymerization precatalyst of structure (xi) was prepared according to the procedure described in US20170137550A1, and the entire contents of US20170137550A1 are incorporated herein by reference.

(Structure xi)

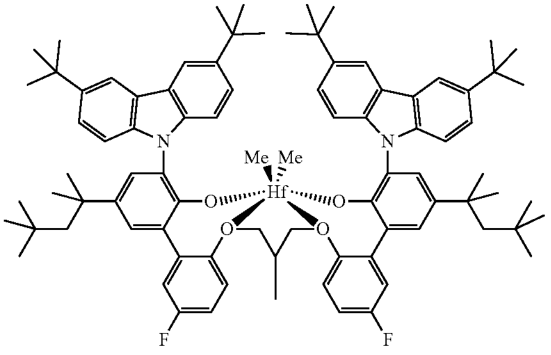

In various embodiments, the gas-phase biphenylphenol polymerization catalysts made from the precatalysts of structures (i), (ii), (iii), (iv), (v), (vi), (vii), (viii), and (ix) can be employed to make a polymer.

Example 1 (EX1), an activated and supported gas-phase biphenylphenol polymerization catalyst of Formula I, was prepared as follows. In a nitrogen-purged glove box an oven-dried glass bottle was charged with 2.65 gram (g) of treated fumed silica (CABOSIL TS-610; available from W. R. Grace) slurried in 75 g of toluene (available from Aldrich), and a stir bar and stirred until well dispersed. 22 g of a 10% solution by weight of methylaluminoxane (MAO) (available from W. R. Grace as 10 wt % in toluene) was added to the bottle to make a mixture. The mixture was stirred magnetically for 15 minutes, then the gas-phase biphenylphenol polymerization precatalyst of structure i (0.303 g) was added and the mixture was stirred for 30-60 minutes. The mixture was spray-dried using a Buchi Mini Spray Dryer B-290 with the following parameters to yield the dried, supported and activated gas-phase biphenylphenol polymerization catalyst of Example 1: Set Temperature—185° C., Outlet Temperature—100° C. (min.), Aspirator—95 and Pump Speed—150 rpm.

Example 2 (EX2) was prepared the same as Example 1 with the change that the activated and supported gas-phase biphenylphenol polymerization catalyst of Example 2 was utilized, as indicated in Table 1.

Example 3 (EX3), was prepared the same as Example 1 with the change that the activated and supported gas-phase biphenylphenol polymerization catalyst of Example 3 was utilized, as indicated in Table 1.

Example 4 (EX4), was prepared the same as Example 1 with the change that the activated and supported gas-phase biphenylphenol polymerization catalyst of Example 4 was utilized, as indicated in Table 1.

Example 5 (EX5), was prepared the same as Example 1 with the change that the activated and supported gas-phase biphenylphenol polymerization catalyst of Example 5 was utilized, as indicated in Table 1.

Example 6 (EX6), was prepared the same as Example 1 with the change that the activated and supported gas-phase biphenylphenol polymerization catalyst of Example 6 was utilized, as indicated in Table 1.

Example 7 (EX7), was prepared the same as Example 1 with the change that the activated and supported gas-phase biphenylphenol polymerization catalyst of Example 7 was utilized at the conditions as indicated in Table 1.

Example 8 (EX8), was prepared the same as Example 1 with the change that the activated and supported gas-phase biphenylphenol polymerization catalyst of Example 8 was utilized, as indicated in Table 1.

Example 9 (EX9), was prepared the same as Example 1 with the change that the activated and supported gas-phase biphenylphenol polymerization catalyst of Example 9 was utilized, as indicated in Table 1.

Comparative Example 1 (CE1), was prepared the same as Example 1 with the change that the catalyst of Comparative Example 1 was utilized, as indicated in Table 1.

Comparative Example 2 (CE2), was prepared the same as CE1 with the change that the catalyst of Comparative Example 2 was prepared at the conditions as indicated in Table 1.

Comparative Example 3 (CE3), was prepared the same as Example 1 with the change that the catalyst of Comparative Example 1 was utilized, as indicated in Table 1.

Comparative Example 4 (CE4), was prepared the same as CE3 with the change that the catalyst of Comparative Example 4 was prepared at the conditions as indicated in Table 1.

Ethylene/1-hexene copolymerizations of each of the individual catalysts of EX1-9 and CE1 were conducted in the gas-phase in a 2 L semi-batch autoclave polymerization reactor equipped with a mechanical agitator as follows. The reactor was first dried for 1 hour, charged with 200 g of sodium chloride (NaCl) and dried by heating at 100° C. under nitrogen for 30 minutes. After drying, 5 gram of silica supported methylaluminoxane (SMAO) was introduced as a scavenger under nitrogen pressure. After adding the SMAO, the reactor was sealed and components were stirred. The reactor was then charged with hydrogen ($H_2$ preload, as indicated below for each condition) and hexene ($C_6/C_2$ ratio, as indicated below for each condition), then pressurized with ethylene (230 psi). Once the system reached a steady state, the type and amount of respective activated catalyst as identified by Table 1 and 2 for each of EX1-9 and CE1 was charged into the reactor at 80° C. to start polymerization. The reactor temperature was brought to 90 or 100° C. and maintained at this temperature throughout the 1 hour run. The runs were conducted at Condition B or K as detailed below in Table 1. At the end of the run, the reactor was cooled down, vented and opened. The resulting product mixture was washed with water and methanol, then dried. The results for EX1-9 and CE1 are shown in Tables 1 and 2.

In various embodiments the gas-phase biphenylphenol polymerization catalysts made from the precatalyst of structure (i), (ii), (iii), (iv), (v), (vi), (vii), (viii), and (ix) can be employed in the gas-phase polymerization catalyst systems herein to make a high molecular weight polyethylene component in a multimodal (e.g., bimodal) polyethylene composition.

Mn (number average molecular weight) and Mw (weight average molecular weight), z-average molecular weight (Mz) were determined by gel permeation chromatography (GPC), as is known in the art.

Productivity (kilograms polymer/kilograms catalyst) was determined as the ratio of polymer made to the amount of catalyst and activator added to the reactor.

Melt temperature (i.e., Tm) can be determined via Differential Scanning calorimetry according to ASTM D 3418-08. For instance, using a scan rate of 10° C./min on a sample of 10 mg and using the second heating cycle.

Comonomer content (i.e., 1-hexene) incorporated in the polymers (weight %)) was determined by rapid FT-IR spectroscopy on the dissolved polymer in a GPC measurement.

B-conditions as follows: Temperature=100° C.; Ethylene=230 pounds per square inch (psi); $H_2/O_2$=0.0017; $C_6/C_2$=0.004.

K-conditions are as follows: Temperature=100° C.; Ethylene=230 psi; $H_2/C_2$=0.0068; $C_6/C_2$=0.004.

TABLE 1

| | Precatalyst structure | Conditions | Cat. Charge (mg) | Cat Prod. (gPE/gcat/hr) |
|---|---|---|---|---|
| EX1 | i | B | 1.6 | 28248 |
| EX2 | ii | B | 1.2 | 39081 |
| EX3 | iii | B | 0.7 | 183,282 |
| EX4 | iv | B | 15.4 | 26,532 |
| EX5 | v | B | 1.2 | 3500 |
| EX6 | vi | B | 10.3 | 6155 |
| EX7 | vii | K | 6.2 | 2967 |
| EX8 | viii | B | 5.2 | 15846 |
| EX9 | ix | B | 12 | 1754 |
| CE1 | x | B | 15.1 | 11053 |
| CE2 | x | K | 14.3 | 4112 |
| CE3 | xi | B | 15.3 | 2379 |
| CE4 | xi | K | 15.5 | 3226 |

TABLE 2

| | Precatalyst Structure | Mn (da) | Mw (da) | Mw/ Mn | Tm (° C.) |
|---|---|---|---|---|---|
| EX1 | i | 149,849 | 523,102 da | 3.49 | 127.1 |
| EX2 | ii | 54,478 | 251,152 da | 4.61 | 127.8 |
| EX3 | iii | 79,681 | 227,628 da | 2.86 | 122.7 |
| EX4 | iv | 32,365 | 205,275 da | 6.34 | 124.3 |
| EX5 | v | 139,957 | 515,608 da | 3.68 | N/A |
| EX6 | vi | 64,498 | 950,298 da | 14.7 | 128.6 |
| EX7 | vii | 245,010 | 619,530 da | 2.53 | 125.8 |
| EX8 | viii | 12,702 | 145,159 da | 11.43 | 120.2 |
| EX9 | ix | 187,700 | 678,100 da | 3.6 | 117.8 |
| CE1 | x | N/A | UHMW (2,000,000+) | N/A | 123.95 |
| CE2 | x | N/A | UHMW (2,000,000+) | N/A | 128.56 |
| CE3 | xi | N/A | UHMW (2,000,000+) | N/A | 122.63 |
| CE4 | xi | N/A | UHMW (2,000,000+) | N/A | 115.58 |

Ultra-High Molecular Weight (UHMW) refers to a single chain polyethylene polymer with a polyethylene equivalent molecular weight of 2,000,000 Daltons or greater as measured by conventional GPC. That is, in Table 2, "UHMW" is listed for those polymers with ultra-high molecular weights that could not be accurately measured by the GPC test method (e.g., due to poor solubility of the polymer, plugging of lines, poor mass recoveries or other analytical problems typically encountered for polyethylene polymers with molecular weights of more than two million Daltons.

As detailed in Tables 1 and 2, EX1-9 provide for the use of a supported gas-phase biphenylphenol polymerization catalyst to make a polymer via a gas-phase polymerization process, where the supported gas-phase biphenylphenol polymerization catalyst is made from a gas-phase biphenylphenol polymerization precatalyst of Formula I.

The resultant polymers of EX1-9 have an improved (i.e., lower) molecular weight than polymers made from comparative catalysts at similar conditions. For instance, each of EX1-9 provides a polymer having a molecular weight in a range of from 150,000 Daltons to 1,200,000 Daltons at B-conditions and/or having a value of less than 500,000 Daltons at K-conditions, which may be desirable for certain applications. For instance, each of the supported gas-phase biphenylphenol polymerization catalysts of EX1-9 can be employed with a metallocene olefin polymerization catalyst to make a gas-phase polymerization catalyst system which can be used in a single gas-phase polymerization reactor to make a multimodal (e.g., bimodal) polymer.

The supported gas-phase biphenylphenol polymerization catalyst of Formula I can be used to make a polymer via a gas-phase polymerization process that has an improved comonomer incorporation relative to an amount of comonomer incorporation in a polymer made via solution-phase polymerization process using a biphenylphenol polymerization catalyst of Formula I (e.g., the same supported gas-phase biphenylphenol polymerization catalyst of Formula I). The supported gas-phase biphenylphenol polymerization catalyst of Formula I can be used to make a polymer via a gas-phase polymerization process that has an improved comonomer incorporation relative to an amount of comonomer incorporation in a polymer made from a comparative gas-phase catalyst under similar gas-phase conditions.

What is claimed is:

1. A method for making a polymer, the method comprising:

contacting a supported gas-phase biphenylphenol polymerization catalyst with an olefin under polymerization conditions in a gas-phase polymerization reactor to make the polymer via a gas-phase polymerization process, wherein the supported gas-phase biphenylphenol polymerization catalyst is made from a gas-phase biphenylphenol polymerization precatalyst of Formula I:

(Formula I)

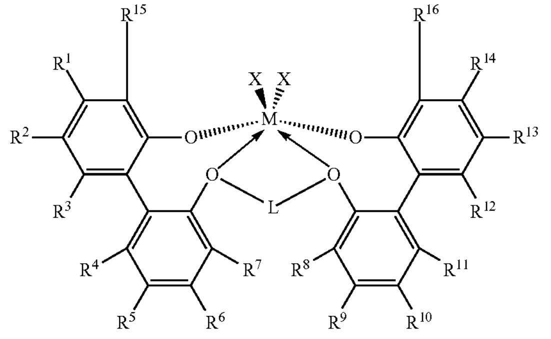

wherein each of $R^5$, $R^7$, $R^8$, and $R^{10}$ is independently is a ($C_1$ to $C_{20}$) alkyl, aryl, aralkyl, halogen, or a hydrogen;

wherein each of $R^4$ and $R^{11}$ independently is a halogen or a hydrogen;

wherein each of $R^2$ and $R^{13}$ independently is a ($C_1$ to $C_{20}$) alkyl, aryl or aralkyl or a hydrogen;

wherein each of $R^{15}$ and $R^{16}$ independently is a 2,7-disubstituted carbazol-9-yl or a 3,6-disubstituted carbazol-9-yl;

wherein L is a linear $C_3$ or $C_4$ alkylene that forms a 3-carbon bridge or 4-carbon bridge, respectively, between the two oxygen atoms to which L is covalently bonded;

wherein each of $R^1$, $R^3$, $R^{12}$, and $R^{14}$ independently is a ($C_1$-$C_5$) alkyl, halogen, or a hydrogen;

wherein each of $R^6$ and $R^9$ is a hydrogen or ($C_1$-$C_8$) alkyl;

wherein each X independently is a halogen, a hydrogen, a ($C_1$-$C_{20}$) alkyl, a ($C_7$-$C_{20}$) aralkyl, a ($C_1$-$C_6$) alkyl-substituted ($C_6$-$C_{12}$) aryl, or a ($C_1$-$C_6$) alkyl-substituted benzyl,—$CH_2Si$ (RC) 3, where RC is ($C_1$-$C_{12}$) hydrocarbon;

wherein M is Zr or Hf; and wherein the polymer formed at B-conditions ($H_2/C_2$=0.0017 and $C_6/C_2$=0.004 at 100° C. and 230 pounds per square inch (psi) ethylene) has a molecular weight (Mw) in a range of from about 150,000 Daltons to about 1,200,000 Daltons; or wherein the polymer formed at K-conditions ($H_2/C_2$=0.0068 and $C_6/C_2$=0.004 at 100° C. and 230 psi) has Mw of less than about 500,000 Daltons.

2. The method of claim 1, wherein each X is a methyl.

3. The method of claim 1, wherein each of $R^1$, $R^3$, $R^{12}$, and $R^{14}$ is a hydrogen.

4. The method of claim 1, wherein the gas-phase biphenylphenol polymerization precatalyst of Formula I is selected from the group consisting of the structures of (i), (ii), (iii), (iv), (v), (vi), (vii), (viii) and (ix)

(i)

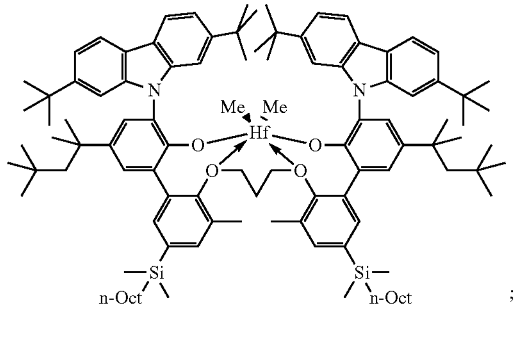

;

(ii)

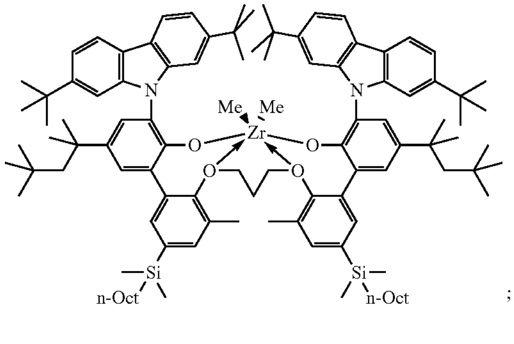

;

-continued
(iii)
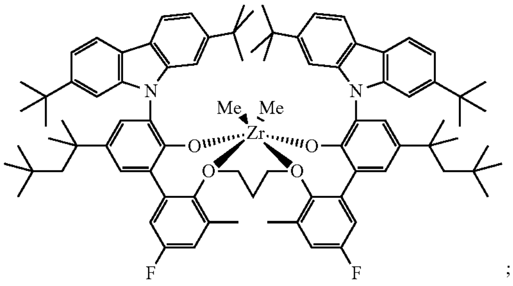
;
(iv)
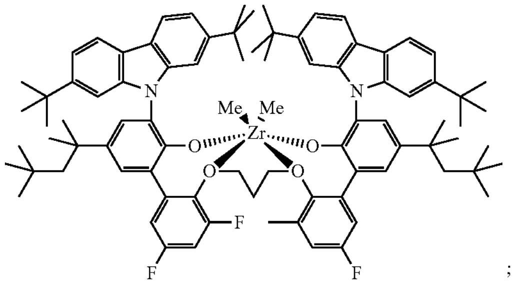
;
(v)
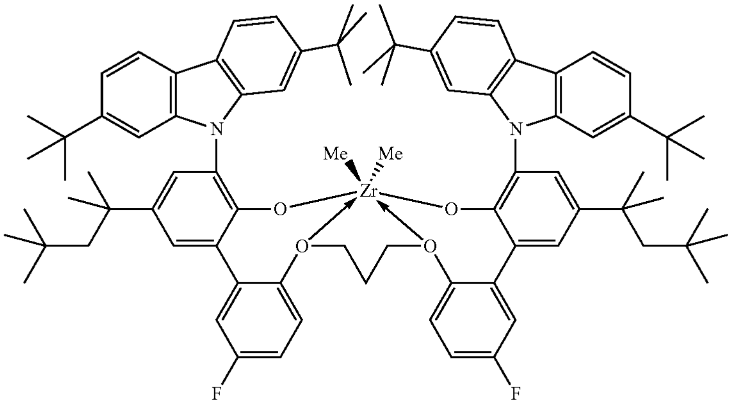
;
(vi)
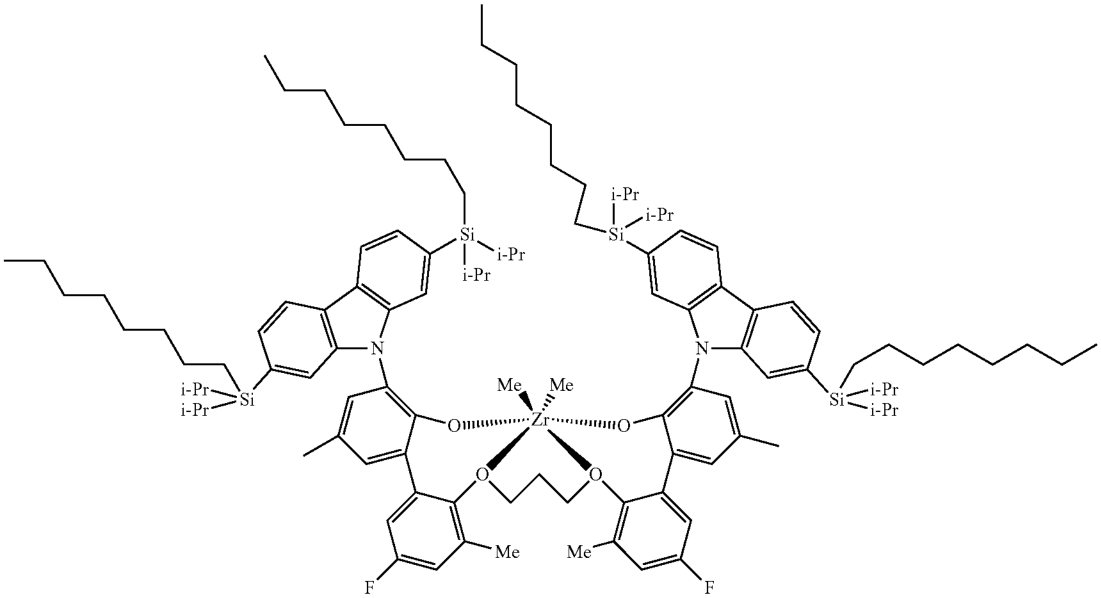
;

-continued
(vii)
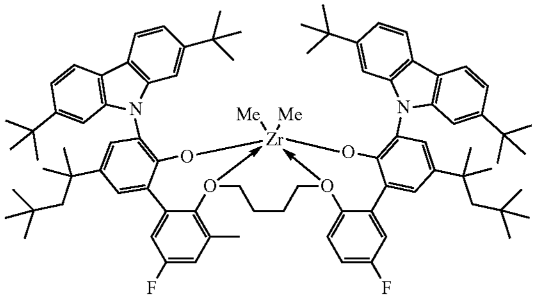
;
(viii)
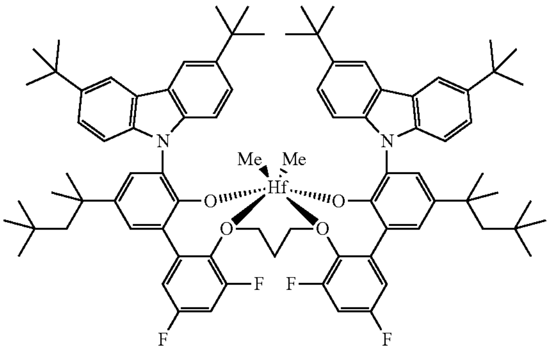
;
and
(ix)
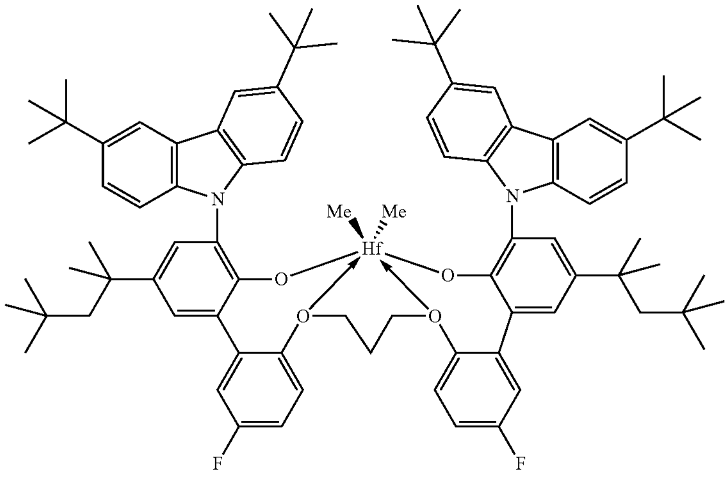
.
5. The method of claim 1, wherein the gas-phase biphenylphenol polymerization precatalyst is selected from the group consisting of the structures of (iii) and (v)
(iii)
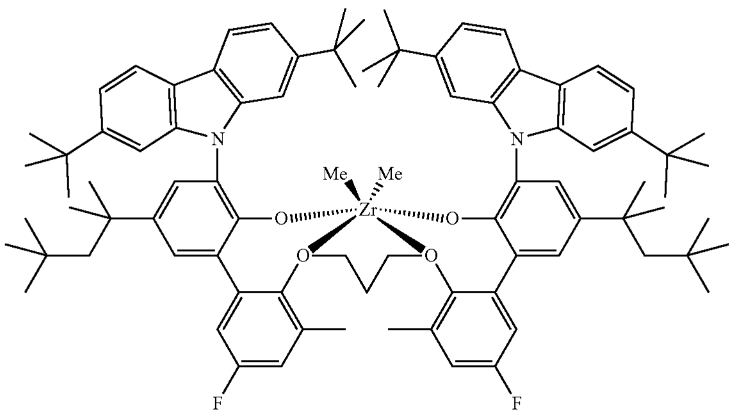
; and -continued (v)

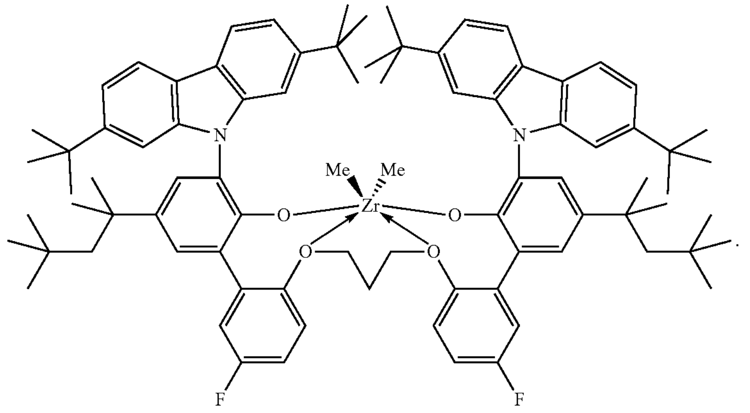

6. A gas-phase polymerization catalyst system to make a polymer via a gas-phase polymerization process, the gas-phase polymerization catalyst system comprising:

a metallocene olefin polymerization catalyst; and the supported gas-phase biphenylphenol polymerization catalyst made from the gas-phase biphenylphenol polymerization precatalyst of Formula I:

(Formula I)

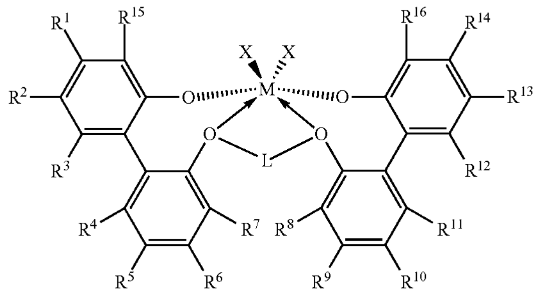

wherein each of $R^5$, $R^7$, $R^8$, and $R^{10}$ is independently is a ($C_1$ to $C_{20}$) alkyl, aryl, aralkyl, halogen, or a hydrogen;

wherein each of $R^4$ and $R^{11}$ independently is a halogen or a hydrogen;

wherein each of $R^2$ and $R^{13}$ independently is a ($C_1$ to $C_{20}$) alkyl, aryl or aralkyl or a hydrogen;

wherein L is a linear $C_3$ or $C_4$ alkylene that forms a 3-carbon bridge or 4-carbon bridge, respectively, between the two oxygen atoms to which L is covalently bonded;

wherein each of $R^1$, $R^3$, $R^{12}$, and $R^{14}$ independently is a ($C_1$-$C_8$) alkyl, halogen, or a hydrogen;

wherein each of $R^6$ and $R^9$ is a hydrogen or ($C_1$-$C_8$) alkyl;

wherein each X independently is a halogen, a hydrogen, a ($C_1$-$C_{20}$) alkyl, a ($C_7$-$C_{20}$) aralkyl, a ($C_1$-$C_6$) alkyl-substituted ($C_6$-$C_{12}$) aryl, or a ($C_1$-$C_6$) alkyl-substituted benzyl,—$CH_2Si$ $(R^C)_3$, where RC is ($C_1$-$C_{12}$) hydrocarbon;

wherein M is Zr or Hf; and wherein each of $R^{15}$ and $R^{16}$ is a 3,6-di-t-butylcarbazol-9-yl.

7. A gas-phase polymerization method to make a polymer, the method comprising:

polymerizing an olefin monomer in a gas-phase polymerization reactor in presence of the gas-phase polymerization catalyst system of claim 6 to make the polymer.

* * * * *